(12) United States Patent
Ramachandra et al.

(10) Patent No.: US 11,026,204 B2
(45) Date of Patent: Jun. 1, 2021

(54) METHODS PROVIDING RELEASE AND RE-DIRECT MESSAGE CONTENTS AND UE BEHAVIOR AND RELATED WIRELESS DEVICES

(71) Applicant: TELEFONAKTIEBOLAGET LM ERICSSON (PUBL), Stockholm (SE)

(72) Inventors: Pradeepa Ramachandra, Linköping (SE); Icaro L. J. da Silva, Solna (SE); Helka-Liina Määttanen, Helsinki (FI); Henning Wiemann, Aachen (DE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 98 days.

(21) Appl. No.: 16/553,046

(22) Filed: Aug. 27, 2019

(65) Prior Publication Data

US 2020/0112937 A1   Apr. 9, 2020

Related U.S. Application Data

(60) Provisional application No. 62/740,542, filed on Oct. 3, 2018.

(51) Int. Cl.
*H04W 56/00* (2009.01)
*H04L 5/00* (2006.01)
*H04W 72/04* (2009.01)

(52) U.S. Cl.
CPC ....... *H04W 56/0065* (2013.01); *H04L 5/0048* (2013.01); *H04W 72/0453* (2013.01)

(58) Field of Classification Search
None
See application file for complete search history.

(56) References Cited

U.S. PATENT DOCUMENTS

| | | | |
|---|---|---|---|
| 9,730,152 B2* | 8/2017 | Lin | H04L 5/14 |
| 2013/0114473 A1* | 5/2013 | Awoniyi | H04W 72/1268 |
| | | | 370/280 |
| 2014/0198640 A1* | 7/2014 | Suzuki | H04L 47/76 |
| | | | 370/230 |
| 2015/0078167 A1* | 3/2015 | Papa | H04W 28/10 |
| | | | 370/235 |
| 2015/0092630 A1* | 4/2015 | Lin | H04W 48/08 |
| | | | 370/280 |
| 2015/0117398 A1* | 4/2015 | Yang | H04W 76/30 |
| | | | 370/331 |
| 2016/0269260 A1* | 9/2016 | Kazmi | H04L 1/20 |
| 2017/0111913 A1* | 4/2017 | Li | H04W 72/042 |
| 2018/0041857 A1* | 2/2018 | Ouchi | H04W 74/08 |
| 2018/0049030 A1* | 2/2018 | Manepalli | H04W 76/18 |
| 2018/0152924 A1* | 5/2018 | Ouchi | H04W 72/0453 |
| 2018/0323922 A1* | 11/2018 | Lindoff | H04W 56/001 |

* cited by examiner

*Primary Examiner* — Jamaal Henson

(57) ABSTRACT

A method of operating a wireless device may be provided. A wireless device may receive a release message from a network node of a radio access network. The release message may include an identification of a redirected carrier. In response to the release message omitting synchronization block related parameters for the redirected carrier, the wireless device may check in measurement information configured for the wireless device for the synchronization block related parameters for the redirected carrier; and may perform synchronization signal measurements for the redirected carrier using the synchronization block related parameters in the measurement information.

26 Claims, 28 Drawing Sheets

Figure 10A

*MeasObjectNR* information element

```
-- ASN1START
-- TAG-MEAS-OBJECT-NR-START

MeasObjectNR ::=                        SEQUENCE {
    ssbFrequency                        ARFCN-ValueNR
        OPTIONAL,    -- Cond SSBorAssociatedSSB
    ssbSubcarrierSpacingSubcarrierSpacing
        OPTIONAL,    -- Cond SSBorAssociatedSSB
    smtc1                               SSB-MTC
        OPTIONAL,    -- Cond SSBorAssociatedSSB
    smtc2                               SSB-MTC2
        OPTIONAL,    -- Cond IntraFreqConnected refFreqCSI-RS                       ARFCN-ValueNR
        OPTIONAL,
    referenceSignalConfig               ReferenceSignalConfig, absThreshSS-BlocksConsolidation     ThresholdNR
        OPTIONAL,    -- Need R
    absThreshCSI-RS-Consolidation       ThresholdNR
        OPTIONAL,    -- Need R nrofSS-BlocksToAverage              INTEGER (2..maxNrofSS-BlocksToAverage)
        OPTIONAL,    -- Need R
    nrofCSI-RS-ResourcesToAverage       INTEGER (2..maxNrofCSI-RS-ResourcesToAverage)
        OPTIONAL,    -- Need R quantityConfigIndex                 INTEGER (1..maxNrofQuantityConfig), offsetMO                            Q-OffsetRangeList, cellsToRemoveList                   PCI-List
        OPTIONAL,    -- Need N
    cellsToAddModList                   CellsToAddModList
        OPTIONAL,    -- Need N blackCellsToRemoveList              PCI-RangeIndexList
        OPTIONAL,    -- Need N
    blackCellsToAddModList              SEQUENCE (SIZE (1..maxNrofPCI-Ranges)) OF PCI-
RangeElement        OPTIONAL,  -- Need N whiteCellsToRemoveList              PCI-RangeIndexList
        OPTIONAL,    -- Need N
    whiteCellsToAddModList              SEQUENCE (SIZE (1..maxNrofPCI-Ranges)) OF PCI-
RangeElement        OPTIONAL,  -- Need N
    ...
}

ReferenceSignalConfig::=                SEQUENCE {
    ssb-ConfigMobility                  SSB-ConfigMobility
        OPTIONAL,    -- Need N
    csi-rs-ResourceConfigMobility       SetupRelease { CSI-RS-ResourceConfigMobility }
        OPTIONAL     -- Need N
}

SSB-ConfigMobility ::=                  SEQUENCE { ssb-ToMeasure                       SetupRelease { SSB-ToMeasure }
        OPTIONAL,    -- Need N
    deriveSSB-IndexFromCell             BOOLEAN, ss-RSSI-Measurement                 SS-RSSI-Measurement
        OPTIONAL,    -- Need N
    ...
}

Q-OffsetRangeList ::=                   SEQUENCE {
    rsrpOffsetSSB                       Q-OffsetRange          DEFAULT dB0,
```

Figure 10B

```
    rsrpOffsetSSB            Q-OffsetRange    DEFAULT dB0,
    sinrOffsetSSB            Q-OffsetRange    DEFAULT dB0,
    rsrpOffsetCSI-RS         Q-OffsetRange    DEFAULT dB0,
    rsrqOffsetCSI-RS         Q-OffsetRange    DEFAULT dB0,
    sinrOffsetCSI-RS         Q-OffsetRange    DEFAULT dB0
}

ThresholdNR ::= SEQUENCE{
    thresholdRSRP            RSRP-Range       OPTIONAL,    -- Need R
    thresholdRSRQ            RSRQ-Range       OPTIONAL,    -- Need R
    thresholdSINR            SINR-Range       OPTIONAL     -- Need R
}

CellsToAddModList ::= SEQUENCE (SIZE (1..maxNrofCellMeas)) OF CellsToAddMod

CellsToAddMod ::= SEQUENCE {
    physCellId               PhysCellId,
    cellIndividualOffset     Q-OffsetRangeList
}

-- TAG-MEAS-OBJECT-NR-STOP
-- ASN1STOP
```

Figure 11

RAN4 would like to inform RAN2 that some of the SSB-related assistance information are missing in current TS 36.331 spec and TS 38.331 spec.

- In TS 38.331,
  - For NR PSCell/SCell addition and handover procedure,
    - The assistance information about SSB timing offset for the target cell is missing in *ServingCellConfigCommon*.
    - It is suggested to provide additional optional information for timing offset of SSB for the target cell based on the timing reference of current serving cell in *ServingCellConfigCommon* to avoid UE blindly search for the SSB of target cell the whole SSB period.
  - For RRC Release with redirection to an inter-frequency NR cell,
    - The SCS of SSB and SMTC are missing in *RedirectedCarrierInfo*.
    - It is suggested to provide additional optional information for SCS of SSB and SMTC periodicity/offset/duration in *RedirectedCarrierInfo* to provide the needed information for UE to search for the SSB of target cell.
- In TS 36.331
  - For RRC Release with redirection to an inter-RAT NR cell,
    - The SCS of SSB and SMTC are missing in *RedirectedCarrierInfo*.
    - It is suggested to provide additional optional information of SCS of SSB and SMTC periodicity/offset/duration in *RedirectedCarrierInfo* to provide the needed information for UE to search for the SSB of target cell.

1. Overall Description:

RAN4 would like to inform to RAN1 and RAN2 that RAN4 has discussed further on the definition of *useServingCellTimingForSync* indication and concluded on the following:

- When *useServingCellTimingForSync* is set to TRUE for the carrier, it means the following:
  - UE can assume frame boundary alignment (including half frame/subframe/slot boundary alignment) across cells on the same frequency carrier, within a tolerance of less than $\min(2 \text{ SSB symbols}, 1 \text{ data symbol})$.

- UE can assume the SFN numbers in all cells on the same frequency carrier are the same.

Figure 12A

*RRCConnectionRelease message*

```
-- ASN1START

RRCConnectionRelease ::=            SEQUENCE {
    rrc-TransactionIdentifier           RRC-TransactionIdentifier,
    criticalExtensions                  CHOICE {
        c1                                  CHOICE {
            rrcConnectionRelease-r8             RRCConnectionRelease-r8-IEs,
            spare3 NULL, spare2 NULL, spare1 NULL
        },
        criticalExtensionsFuture            SEQUENCE {}
    }
}

RRCConnectionRelease-r8-IEs ::=     SEQUENCE {
    releaseCause                        ReleaseCause,
    redirectedCarrierInfo               RedirectedCarrierInfo           OPTIONAL,    --
Need ON
    idleModeMobilityControlInfo         IdleModeMobilityControlInfo     OPTIONAL,    --
Need OP
    nonCriticalExtension                RRCConnectionRelease-v890-IEs   OPTIONAL
}

RRCConnectionRelease-v890-IEs ::=   SEQUENCE {
    lateNonCriticalExtension            OCTET STRING (CONTAINING RRCConnectionRelease-v9e0-
IEs)    OPTIONAL,
    nonCriticalExtension                RRCConnectionRelease-v920-IEs   OPTIONAL
}

-- Late non critical extensions
RRCConnectionRelease-v9e0-IEs ::= SEQUENCE {
    redirectedCarrierInfo-v9e0          RedirectedCarrierInfo-v9e0      OPTIONAL,    --
Cond NoRedirect-r9
    idleModeMobilityControlInfo-v9e0    IdleModeMobilityControlInfo-v9e0 OPTIONAL,   --
Cond IdleInfoEUTRA
    nonCriticalExtension                SEQUENCE {}                     OPTIONAL
}

-- Regular non critical extensions
RRCConnectionRelease-v920-IEs ::=   SEQUENCE {
    cellInfoList-r9                     CHOICE {
        geran-r9                            CellInfoListGERAN-r9,
        utra-FDD-r9                         CellInfoListUTRA-FDD-r9,
        utra-TDD-r9                         CellInfoListUTRA-TDD-r9,
        ...,
        utra-TDD-r10                        CellInfoListUTRA-TDD-r10
    }                                                                   OPTIONAL,    -- Cond
Redirection
    nonCriticalExtension                RRCConnectionRelease-v1020-IEs  OPTIONAL
```

RRCConnectionRelease-v1020-IEs ::=  SEQUENCE {
    extendedWaitTime-r10              INTEGER (1..1800)       OPTIONAL,   -- Need ON
    nonCriticalExtension              RRCConnectionRelease-v1320-IEs                  OPTIONAL
}

RRCConnectionRelease-v1320-IEs::=   SEQUENCE {
    resumeIdentity-r13                ResumeIdentity-r13      OPTIONAL,   -- Need OR nonCriticalExtension              RRCConnectionRelease-v15x0-IEs OPTIONAL
}

RRCConnectionRelease-v15x0-IEs ::= SEQUENCE {
    drb-ContinueROHC-r15              ENUMERATED {true}       OPTIONAL,   -- Cond UP-EDT
    nextHopChainingCount-r15          NextHopChainingCount    OPTIONAL,   -- Cond
UP-EDT
    rrc-InactiveConfig-r15            RRC-InactiveConfig-r15  OPTIONAL,   -- Need OR
    idleModeMeasurementConfig-r15     IdleModeMeasurementConfigDedicated-r15 OPTIONAL, --
Need ON
    nonCriticalExtension              RRCConnectionRelease-v15y0-IEs
 OPTIONAL
}

RRCConnectionRelease-v15y0-IEs ::= SEQUENCE {
    redirectedCarrierInfo-r15         RedirectedCarrierInfo-r15  OPTIONAL,   -- Cond
RedirectionNR
    nonCriticalExtension              SEQUENCE{}              OPTIONAL
}

ReleaseCause ::=                  ENUMERATED {loadBalancingTAUrequired,
                                  other, cs-FallbackHighPriority-v1020, rrc-Suspend-
v1320}

RedirectedCarrierInfo ::=         CHOICE {
    eutra                             ARFCN-ValueEUTRA,
    geran                             CarrierFreqsGERAN,
    utra-FDD                          ARFCN-ValueUTRA,
    utra-TDD                          ARFCN-ValueUTRA,
    cdma2000-HRPD                     CarrierFreqCDMA2000,
    cdma2000-1xRTT                    CarrierFreqCDMA2000,
    ...,
    utra-TDD-r10                      CarrierFreqListUTRA-TDD-r10,
    nr-r15                            ARFCN-ValueNR-r15
}

RedirectedCarrierInfo-v9e0 ::=    SEQUENCE {
    eutra-v9e0                        ARFCN-ValueEUTRA-v9e0
}

RedirectedCarrierInfo-r15 ::=     SEQUENCE {
    subcarrierSpacingSSB-r15          ENUMERATED {kHz15, kHz30, kHz120, kHz240},
    smtc-targetNRcell-r15             MTC-SSB-NR-r15,                     OPTIONAL,  --
Need OP
}

RRC-InactiveConfig-r15::=         SEQUENCE {
    i-RNTI-r15                        I-RNTI-Value-r15,
    --FFS: same as defaultPagingCycle
    ran-PagingCycle-r15               ENUMERATED {  rf32, rf64, rf128, rf256}  OPTIONAL,  --
Need OR
    ran-NotificationAreaInfo-r15      RAN-NotificationAreaInfo-r15,
    --FFS: same as light connection?
    periodic-RNAU-timer-r15           ENUMERATED {min5, min10, min30, min60,
                                         min120, min360, min720, infinity}, nextHopChainingCount-r15          NextHopChainingCount OPTIONAL,
    nonCriticalExtension              SEQUENCE{}      OPTIONAL
}

RAN-NotificationAreaInfo-r15      ::= CHOICE {
    cellList-r15                      PLMN-RAN-AreaCellList-r15,
```

Figure 12C

```
        ran-AreaConfigList-r15     PLMN-RAN-AreaConfigList-r15
}

PLMN-RAN-AreaCellList-r15    ::=     SEQUENCE (SIZE (1..maxPLMN-r11)) OF PLMN-RAN-AreaCell-
r15
-- Total number of cells from all PLMNs does not exceed 32

PLMN-RAN-AreaCell-r15    ::= SEQUENCE {
    plmn-Identity-r15              PLMN-Identity,
    ran-AreaCells-r15              SEQUENCE (SIZE (1..32)) OF CellIdentity
}

PLMN-RAN-AreaConfigList-r15 ::=     SEQUENCE (SIZE (1..maxPLMN-r11)) OF PLMN-RAN-
AreaConfig-r15

PLMN-RAN-AreaConfig-r15 ::= SEQUENCE {
    plmn-Identity-r15          PLMN-Identity,
    ran-Area-r15               SEQUENCE (SIZE (1..16)) OF RAN-AreaConfig-r15
}

-- Total number of TACs from all PLMNs does not exceed 16
-- Total number of RAN-AreaCodes from all PLMNs does not exceed 32

RAN-AreaConfig-r15 ::= SEQUENCE {
    trackingAreaCode-5GC-r15       TrackingAreaCode-5GC-r15,
    ran-AreaCodeList-r15           SEQUENCE (SIZE (1..32)) OF RAN-AreaCode-r15
    OPTIONAL
}

CarrierFreqListUTRA-TDD-r10 ::=        SEQUENCE (SIZE (1..maxFreqUTRA-TDD-r10)) OF ARFCN-
ValueUTRA IdleModeMobilityControlInfo ::=     SEQUENCE {
    freqPriorityListEUTRA               FreqPriorityListEUTRA           OPTIONAL,   --
Need ON
    freqPriorityListGERAN               FreqsPriorityListGERAN          OPTIONAL,   --
Need ON
    freqPriorityListUTRA-FDD            FreqPriorityListUTRA-FDD        OPTIONAL,   --
Need ON
    freqPriorityListUTRA-TDD            FreqPriorityListUTRA-TDD        OPTIONAL,   --
Need ON
    bandClassPriorityListHRPD           BandClassPriorityListHRPD       OPTIONAL,   --
Need ON
    bandClassPriorityList1XRTT          BandClassPriorityList1XRTT      OPTIONAL,   --
Need ON
    t320                                ENUMERATED {
                                           min5, min10, min20, min30, min60, min120, min180,
                                           spare1}                      OPTIONAL,   --
Need ON
    ...,
    [[ freqPriorityListExtEUTRA-r12     FreqPriorityListExtEUTRA-r12    OPTIONAL
    -- Need ON
    ]],
    [[ freqPriorityListEUTRA-v1310      FreqPriorityListEUTRA-v1310     OPTIONAL,
    -- Need ON
       freqPriorityListExtEUTRA-v1310   FreqPriorityListExtEUTRA-v1310  OPTIONAL
    -- Need ON
    ]],
    [[ freqPriorityListNR-r15           FreqPriorityListNR-r15          OPTIONAL    --
Need ON
    ]]
}

IdleModeMobilityControlInfo-v9e0 ::=    SEQUENCE {
    freqPriorityListEUTRA-v9e0          SEQUENCE (SIZE (1..maxFreq)) OF FreqPriorityEUTRA-v9e0
}

FreqPriorityListEUTRA ::=           SEQUENCE (SIZE (1..maxFreq)) OF FreqPriorityEUTRA FreqPriorityListExtEUTRA-r12 ::=    SEQUENCE (SIZE (1..maxFreq)) OF FreqPriorityEUTRA-r12

FreqPriorityListEUTRA-v1310 ::=     SEQUENCE (SIZE (1..maxFreq)) OF FreqPriorityEUTRA-
v1310
```

Figure 12D

```
FreqPriorityListEUTRA-v1310 ::=      SEQUENCE (SIZE (1..maxFreq)) OF FreqPriorityEUTRA-
v1310

FreqPriorityEUTRA ::=                SEQUENCE {
    carrierFreq                          ARFCN-ValueEUTRA,
    cellReselectionPriority              CellReselectionPriority
}

FreqPriorityEUTRA-v9e0 ::=           SEQUENCE {
    carrierFreq-v9e0                     ARFCN-ValueEUTRA-v9e0        OPTIONAL    -- Cond
EARFCN-max
}

FreqPriorityEUTRA-r12 ::=            SEQUENCE {
    carrierFreq-r12                      ARFCN-ValueEUTRA-r9,
    cellReselectionPriority-r12          CellReselectionPriority
}

FreqPriorityEUTRA-v1310 ::=          SEQUENCE {
    cellReselectionSubPriority-r13       CellReselectionSubPriority-r13    OPTIONAL
        -- Need ON
}

FreqPriorityListNR-r15 ::=           SEQUENCE (SIZE (1..maxFreqNR-r15)) OF FreqPriorityNR-r15

FreqPriorityNR-r15 ::=               SEQUENCE {
    carrierFreq-r15                      ARFCN-ValueNR-r15,
    cellReselectionPriority-r15          CellReselectionPriority
}

FreqsPriorityListGERAN ::=           SEQUENCE (SIZE (1..maxGNFG)) OF FreqsPriorityGERAN FreqsPriorityGERAN ::=               SEQUENCE {
    carrierFreqs                         CarrierFreqsGERAN,
    cellReselectionPriority              CellReselectionPriority
}

FreqPriorityListUTRA-FDD ::=         SEQUENCE (SIZE (1..maxUTRA-FDD-Carrier)) OF
FreqPriorityUTRA-FDD FreqPriorityUTRA-FDD ::=             SEQUENCE {
    carrierFreq                          ARFCN-ValueUTRA,
    cellReselectionPriority              CellReselectionPriority
}

FreqPriorityListUTRA-TDD ::=         SEQUENCE (SIZE (1..maxUTRA-TDD-Carrier)) OF
FreqPriorityUTRA-TDD FreqPriorityUTRA-TDD ::=             SEQUENCE {
    carrierFreq                          ARFCN-ValueUTRA,
    cellReselectionPriority              CellReselectionPriority
}

BandClassPriorityListHRPD ::=        SEQUENCE (SIZE (1..maxCDMA-BandClass)) OF
BandClassPriorityHRPD BandClassPriorityHRPD ::=            SEQUENCE {
    bandClass                            BandclassCDMA2000,
    cellReselectionPriority              CellReselectionPriority
}

BandClassPriorityList1XRTT ::= SEQUENCE (SIZE (1..maxCDMA-BandClass)) OF
BandClassPriority1XRTT BandClassPriority1XRTT ::=           SEQUENCE {
    bandClass                            BandclassCDMA2000,
    cellReselectionPriority              CellReselectionPriority
}

CellInfoListGERAN-r9 ::=             SEQUENCE (SIZE (1..maxCellInfoGERAN-r9)) OF CellInfoGERAN-r9

CellInfoGERAN-r9 ::=                 SEQUENCE {
    physCellId-r9                        PhysCellIdGERAN,
    carrierFreq-r9                       CarrierFreqGERAN,
    systemInformation-r9                 SystemInfoListGERAN
```

Figure 12E

```
CellInfoListUTRA-FDD-r9 ::=    SEQUENCE (SIZE (1..maxCellInfoUTRA-r9)) OF CellInfoUTRA-
FDD-r9

CellInfoUTRA-FDD-r9 ::=        SEQUENCE {
    physCellId-r9                  PhysCellIdUTRA-FDD,
    utra-BCCH-Container-r9         OCTET STRING
}

CellInfoListUTRA-TDD-r9 ::=    SEQUENCE (SIZE (1..maxCellInfoUTRA-r9)) OF CellInfoUTRA-
TDD-r9

CellInfoUTRA-TDD-r9 ::=        SEQUENCE {
    physCellId-r9                  PhysCellIdUTRA-TDD,
    utra-BCCH-Container-r9         OCTET STRING
}

CellInfoListUTRA-TDD-r10 ::=   SEQUENCE (SIZE (1..maxCellInfoUTRA-r9)) OF CellInfoUTRA-
TDD-r10

CellInfoUTRA-TDD-r10 ::=       SEQUENCE {
    physCellId-r10                 PhysCellIdUTRA-TDD,
    carrierFreq-r10                ARFCN-ValueUTRA,
    utra-BCCH-Container-r10        OCTET STRING
}

-- ASN1STOP
```

Figure 13A

| *RRCConnectionRelease* field descriptions |
|---|
| carrierFreq or bandClass<br>The carrier frequency (UTRA and E-UTRA) and band class (HRPD and 1xRTT) for which the associated cellReselectionPriority is applied. |
| carrierFreqs<br>The list of GERAN carrier frequencies organised into one group of GERAN carrier frequencies. |
| cellInfoList<br>Used to provide system information of one or more cells on the redirected inter-RAT carrier frequency. The system information can be used if, upon redirection, the UE selects an inter-RAT cell indicated by the *physCellId* and *carrierFreq* (GERAN and UTRA TDD) or by the *physCellId* (other RATs). The choice shall match the *redirectedCarrierInfo*. In particular, E-UTRAN only applies value *utra-TDD-r10* in case *redirectedCarrierInfo* is set to *utra-TDD-r10*. |
| drb-ContinueROHC<br>This field indicates whether to continue or reset the header compression protocol context for the DRBs configured with the header compression protocol. Presence of the field indicates that the header compression protocol context continues when UE initiates UP-EDT in the same cell, while absence indicates that the header compression protocol context is reset. |
| extendedWaitTime<br>Value in seconds for the wait time for Delay Tolerant access requests. |
| freqPriorityListX<br>Provides a cell reselection priority for each frequency, by means of separate lists for each RAT (including E-UTRA). The UE shall be able to store at least 3 occurrences of *FreqsPriorityGERAN*. If E-UTRAN includes *freqPriorityListEUTRA-v9e0* and/or *freqPriorityListEUTRA-v1310* it includes the same number of entries, and listed in the same order, as in *freqPriorityListEUTRA* (i.e. without suffix). Field *freqPriorityListExt* includes additional neighbouring inter-frequencies, i.e. extending the size of the inter-frequency carrier list using the general principles specified in 5.1.2. EUTRAN only includes *freqPriorityListExtEUTRA* if *freqPriorityListEUTRA* (i.e without suffix) includes *maxFreq* entries. If E-UTRAN includes *freqPriorityListExtEUTRA-v1310* it includes the same number of entries, and listed in the same order, as in *freqPriorityListExtEUTRA-r12*. |
| idleModeMeasurementConfig<br>Indicates measurement configuration to be used by the UE in RRC_IDLE. |
| idleModeMobilityControlInfo<br>Provides dedicated cell reselection priorities. Used for cell reselection as specified in TS 36.304 [4]. For E-UTRA and UTRA frequencies, a UE that supports multi-band cells for the concerned RAT considers the dedicated priorities to be common for all overlapping bands (i.e. regardless of the ARFCN that is used). |
| redirectedCarrierInfo<br>The *redirectedCarrierInfo* indicates a carrier frequency (downlink for FDD) and is used to redirect the UE to an E-UTRA or an inter-RAT carrier frequency, by means of the cell selection upon leaving RRC_CONNECTED as specified in TS 36.304 [4]. The value *geran* can only be included after successful security activation when UE is connected to 5GC. |
| releaseCause<br>The *releaseCause* is used to indicate the reason for releasing the RRC Connection. The cause value *cs-FallbackHighPriority* is only applicable when *redirectedCarrierInfo* is present with the value set to *utra-FDD*, *utra-TDD* or *utra-TDD-r10*.<br>E-UTRAN should not set the *releaseCause* to *loadBalancingTAURequired* or to *cs-FallbackHighPriority* if the *extendedWaitTime* is present. |
| systemInformation<br>Container for system information of the GERAN cell i.e. one or more System Information (SI) messages as defined in TS 44.018 [45, table 9.1.1]. |
| t320<br>Timer T320 as described in section 7.3. Value minN corresponds to N minutes. |
| utra-BCCH-Container<br>Contains System Information Container message as defined in TS 25.331 [19]. |
| smtc-targetNRcell<br>This IE indicates the SMTC of the redirected target NR cell SSB based on the timing reference of current serving cell. If this IE is absent, UE will assume 5ms SMTC periodicity as specified in section 4.1 of TS 38.213. |
| subcarrierSpacingSSB<br>Indicate subcarrier spacing of SSB of redirected target NR cell. Only the values 15 or 30 (<6GHz), 120 kHz or 240 kHz (>6GHz) are applicable. |

Figure 13B

| Conditional presence | Explanation |
|---|---|
| EARFCN-max | The field is mandatory present if the corresponding carrierFreq (i.e. without suffix) is set to maxEARFCN. Otherwise the field is not present. |
| IdleInfoEUTRA | The field is optionally present, need OP, if the IdleModeMobilityControlInfo (i.e. without suffix) is included and includes freqPriorityListEUTRA; otherwise the field is not present. |
| NoRedirect-r8 | The field is optionally present, need OP, if the redirectedCarrierInfo (i.e. without suffix) is not included, otherwise the field is not present. |
| Redirection | The field is optionally present, need ON, if the redirectedCarrierInfo is included and set to geran, utra-FDD, utra-TDD or utra-TDD-r10; otherwise the field is not present. |
| UP-EDT | The field is optionally present, need ON, if the UE supports EDT and releaseCause is set to rrc-Suspend, otherwise the field is not present. |
| RedirectionNR | The field is mandatory present, if the redirectedCarrierInfo is included and set to 'nr-r15', otherwise the field is not present. |

Figure 16A

*RRCConnectionRelease message*

```
-- ASN1START

RRCConnectionRelease ::=            SEQUENCE {
    rrc-TransactionIdentifier          RRC-TransactionIdentifier,
    criticalExtensions                 CHOICE {
        c1                                 CHOICE {
            rrcConnectionRelease-r8            RRCConnectionRelease-r8-IEs,
            spare3 NULL, spare2 NULL, spare1 NULL
        },
        criticalExtensionsFuture           SEQUENCE {}
    }
}

RRCConnectionRelease-r8-IEs ::=     SEQUENCE {
    releaseCause                        ReleaseCause,
    redirectedCarrierInfo               RedirectedCarrierInfo             OPTIONAL,   --
Need ON
    idleModeMobilityControlInfo         IdleModeMobilityControlInfo       OPTIONAL,   --
Need OP
    nonCriticalExtension                RRCConnectionRelease-v890-IEs     OPTIONAL
}

RRCConnectionRelease-v890-IEs ::=   SEQUENCE {
    lateNonCriticalExtension            OCTET STRING (CONTAINING RRCConnectionRelease-v9e0-
IEs)   OPTIONAL,
    nonCriticalExtension                RRCConnectionRelease-v920-IEs     OPTIONAL
}

-- Late non critical extensions
RRCConnectionRelease-v9e0-IEs ::= SEQUENCE {
    redirectedCarrierInfo-v9e0          RedirectedCarrierInfo-v9e0        OPTIONAL,   --
Cond NoRedirect-r8
    idleModeMobilityControlInfo-v9e0    IdleModeMobilityControlInfo-v9e0  OPTIONAL,   --
Cond IdleInfoUTRA
    nonCriticalExtension                SEQUENCE {}                       OPTIONAL
}

-- Regular non critical extensions
RRCConnectionRelease-v920-IEs ::=   SEQUENCE {
    cellInfoList-r9                     CHOICE {
        geran-r9                            CellInfoListGERAN-r9,
        utra-FDD-r9                         CellInfoListUTRA-FDD-r9,
        utra-TDD-r9                         CellInfoListUTRA-TDD-r9,
        ...,
        utra-TDD-r10                        CellInfoListUTRA-TDD-r10
    }                                                                     OPTIONAL,   -- Cond
Redirection
    nonCriticalExtension                RRCConnectionRelease-v1020-IEs    OPTIONAL
```

RRCConnectionRelease-v1020-IEs ::= SEQUENCE {
    extendedWaitTime-r10              INTEGER (1..1800)       OPTIONAL,   -- Need ON
    nonCriticalExtension              RRCConnectionRelease-v1320-IEs        OPTIONAL
}

RRCConnectionRelease-v1320-IEs::=  SEQUENCE {
    resumeIdentity-r13                ResumeIdentity-r13      OPTIONAL,   -- Need OR nonCriticalExtension              RRCConnectionRelease-v15x0-IEs OPTIONAL
}

RRCConnectionRelease-v15x0-IEs ::= SEQUENCE {
    drb-ContinueROHC-r15              ENUMERATED (true)       OPTIONAL,   -- Cond UP-EDT
    nextHopChainingCount-r15          NextHopChainingCount    OPTIONAL,   -- Cond
UP-EDT
    rrc-InactiveConfig-r15            RRC-InactiveConfig-r15  OPTIONAL,   -- Need OR
    idleModeMeasurementConfig-r15     IdleModeMeasurementConfigDedicated-r15 OPTIONAL, --
Need ON
    nonCriticalExtension              RRCConnectionRelease-v15y0-IEs
    OPTIONAL
}

RRCConnectionRelease-v15y0-IEs ::= SEQUENCE {
    redirectedCarrierInfo-r15         RedirectedCarrierInfo-r15  OPTIONAL,  -- Cond
RedirectionNR
    nonCriticalExtension              SEQUENCE{}              OPTIONAL
}

ReleaseCause ::=                    ENUMERATED {loadBalancingTAUrequired,
                                    other, cs-FallbackHighPriority-v1020, rrc-Suspend-
v1320}

RedirectedCarrierInfo ::=           CHOICE {
    eutra                             ARFCN-ValueEUTRA,
    geran                             CarrierFreqsGERAN,
    utra-FDD                          ARFCN-ValueUTRA,
    utra-TDD                          ARFCN-ValueUTRA,
    cdma2000-HRPD                     CarrierFreqCDMA2000,
    cdma2000-1xRTT                    CarrierFreqCDMA2000,
    ...,
    utra-TDD-r10                      CarrierFreqListUTRA-TDD-r10,
    nr-r15                            ARFCN-ValueNR-r15
}

RedirectedCarrierInfo-v9e0 ::=      SEQUENCE {
    eutra-v9e0                        ARFCN-ValueEUTRA-v9e0
}

RedirectedCarrierInfo-r15 ::=       SEQUENCE {
    subcarrierSpacingSSB-r15          ENUMERATED {kHz15, kHz30, kHz120, kHz240},  OPTIONAL,
-- Need OP
    smtc-targetNRcell-r15             MTC-SSB-NR-r15,                        OPTIONAL  --
Need OP
}

RRC-InactiveConfig-r15::=           SEQUENCE {
    i-RNTI-r15                        I-RNTI-Value-r15,
    --FFS: same as defaultPagingCycle
    ran-PagingCycle-r15               ENUMERATED { rf32, rf64, rf128, rf256}  OPTIONAL, --
Need OR
    ran-NotificationAreaInfo-r15      RAN-NotificationAreaInfo-r15,
    --FFS: same as light connection?
    periodic-RNAU-timer-r15           ENUMERATED {min5, min10, min30, min60,
                                      min120, min360, min720, infinity}, nextHopChainingCount-r15          NextHopChainingCount OPTIONAL,
    nonCriticalExtension              SEQUENCE{}   OPTIONAL
}

RAN-NotificationAreaInfo-r15    ::= CHOICE {
```

Figure 16C

```
        cellList-r15                  PLMN-RAN-AreaCellList-r15,
        ran-AreaConfigList-r15        PLMN-RAN-AreaConfigList-r15
}

PLMN-RAN-AreaCellList-r15    ::=      SEQUENCE (SIZE (1..maxPLMN-r11)) OF PLMN-RAN-AreaCell-
r15
-- Total number of cells from all PLMNs does not exceed 32

PLMN-RAN-AreaCell-r15    ::= SEQUENCE {
    plmn-Identity-r15             PLMN-Identity,
    ran-AreaCells-r15             SEQUENCE (SIZE (1..32)) OF CellIdentity
}

PLMN-RAN-AreaConfigList-r15 ::=       SEQUENCE (SIZE (1..maxPLMN-r11)) OF PLMN-RAN-
AreaConfig-r15

PLMN-RAN-AreaConfig-r15 ::= SEQUENCE {
    plmn-Identity-r15             PLMN-Identity,
    ran-Area-r15                  SEQUENCE (SIZE (1..16)) OF RAN-AreaConfig-r15
}

-- Total number of TACs from all PLMNs does not exceed 16
-- Total number of RAN-AreaCodes from all PLMNs does not exceed 32

RAN-AreaConfig-r15 ::= SEQUENCE {
    trackingAreaCode-5GC-r15      TrackingAreaCode-5GC-r15,
    ran-AreaCodeList-r15          SEQUENCE (SIZE (1..32)) OF RAN-AreaCode-r15
    OPTIONAL
}

CarrierFreqListUTRA-TDD-r10 ::=       SEQUENCE (SIZE (1..maxFreqUTRA-TDD-r10)) OF ARFCN-
ValueUTRA IdleModeMobilityControlInfo ::=       SEQUENCE {
    freqPriorityListEUTRA              FreqPriorityListEUTRA            OPTIONAL,    --
Need ON
    freqPriorityListGERAN              FreqPriorityListGERAN            OPTIONAL,    --
Need ON
    freqPriorityListUTRA-FDD           FreqPriorityListUTRA-FDD         OPTIONAL,    --
Need ON
    freqPriorityListUTRA-TDD           FreqPriorityListUTRA-TDD         OPTIONAL,    --
Need ON
    bandClassPriorityListHRPD          BandClassPriorityListHRPD        OPTIONAL,    --
Need ON
    bandClassPriorityList1XRTT         BandClassPriorityList1XRTT       OPTIONAL,    --
Need ON
    t320                               ENUMERATED {
                                         min5, min10, min20, min30, min60, min120, min180,
                                         spare1}                        OPTIONAL,    --
Need OR
    ...,
    [[  freqPriorityListExtEUTRA-r12   FreqPriorityListExtEUTRA-r12     OPTIONAL
    -- Need ON
    ]],
    [[  freqPriorityListEUTRA-v1310    FreqPriorityListEUTRA-v1310      OPTIONAL,    --
Need ON
        freqPriorityListExtEUTRA-v1310 FreqPriorityListExtEUTRA-v1310   OPTIONAL
    -- Need ON
    ]],
    [[  freqPriorityListNR-r15         FreqPriorityListNR-r15           OPTIONAL     --
Need ON
    ]]
}

IdleModeMobilityControlInfo-v9e0 ::= SEQUENCE {
    freqPriorityListEUTRA-v9e0         SEQUENCE (SIZE (1..maxFreq)) OF FreqPriorityEUTRA-v9e0
}

FreqPriorityListEUTRA ::=              SEQUENCE (SIZE (1..maxFreq)) OF FreqPriorityEUTRA FreqPriorityListExtEUTRA-r12 ::=       SEQUENCE (SIZE (1..maxFreq)) OF FreqPriorityEUTRA-r12

FreqPriorityListEUTRA-v1310 ::=        SEQUENCE (SIZE (1..maxFreq)) OF FreqPriorityEUTRA-
v1310
```

Figure 16D

```
FreqPriorityListExtEUTRA-v1310 ::=    SEQUENCE (SIZE (1..maxFreq)) OF FreqPriorityEUTRA-
v1310

FreqPriorityEUTRA ::=                 SEQUENCE {
    carrierFreq                           ARFCN-ValueEUTRA,
    cellReselectionPriority               CellReselectionPriority
}

FreqPriorityEUTRA-v9e0 ::=            SEQUENCE {
    carrierFreq-v9e0                      ARFCN-ValueEUTRA-v9e0     OPTIONAL   -- Cond
EARFCN-max
}

FreqPriorityEUTRA-r12 ::=             SEQUENCE {
    carrierFreq-r12                       ARFCN-ValueEUTRA-r9,
    cellReselectionPriority-r12           CellReselectionPriority
}

FreqPriorityEUTRA-v1310 ::=           SEQUENCE {
    cellReselectionSubPriority-r13            CellReselectionSubPriority-r13     OPTIONAL
        -- Need OR
}

FreqPriorityListNR-r15 ::=            SEQUENCE (SIZE (1..maxFreqNR-r15)) OF FreqPriorityNR-r15

FreqPriorityNR-r15 ::=                SEQUENCE {
    carrierFreq-r15                       ARFCN-ValueNR-r15,
    cellReselectionPriority-r15           CellReselectionPriority
}

FreqsPriorityListGERAN ::=            SEQUENCE (SIZE (1..maxGNFG)) OF FreqsPriorityGERAN FreqsPriorityGERAN ::=                SEQUENCE {
    carrierFreqs                          CarrierFreqsGERAN,
    cellReselectionPriority               CellReselectionPriority
}

FreqPriorityListUTRA-FDD ::=          SEQUENCE (SIZE (1..maxUTRA-FDD-Carrier)) OF
FreqPriorityUTRA-FDD FreqPriorityUTRA-FDD ::=              SEQUENCE {
    carrierFreq                           ARFCN-ValueUTRA,
    cellReselectionPriority               CellReselectionPriority
}

FreqPriorityListUTRA-TDD ::=          SEQUENCE (SIZE (1..maxUTRA-TDD-Carrier)) OF
FreqPriorityUTRA-TDD FreqPriorityUTRA-TDD ::=              SEQUENCE {
    carrierFreq                           ARFCN-ValueUTRA,
    cellReselectionPriority               CellReselectionPriority
}

BandClassPriorityListHRPD ::=         SEQUENCE (SIZE (1..maxCDMA-BandClass)) OF
BandClassPriorityHRPD BandClassPriorityHRPD ::=             SEQUENCE {
    bandClass                             BandclassCDMA2000,
    cellReselectionPriority               CellReselectionPriority
}

BandClassPriorityList1XRTT ::= SEQUENCE (SIZE (1..maxCDMA-BandClass)) OF
BandClassPriority1XRTT BandClassPriority1XRTT ::=            SEQUENCE {
    bandClass                             BandclassCDMA2000,
    cellReselectionPriority               CellReselectionPriority
}

CellInfoListGERAN-r9 ::=              SEQUENCE (SIZE (1..maxCellInfoGERAN-r9)) OF CellInfoGERAN-r9

CellInfoGERAN-r9 ::=                  SEQUENCE {
    physCellId-r9                         PhysCellIdGERAN,
    carrierFreq-r9                        CarrierFreqGERAN,
    systemInformation-r9                  SystemInfoListGERAN
```

Figure 16E

```
CellInfoListUTRA-FDD-r9 ::=   SEQUENCE (SIZE (1..maxCellInfoUTRA-r9)) OF CellInfoUTRA-
FDD-r9
CellInfoUTRA-FDD-r9 ::=   SEQUENCE {
    physCellId-r9           PhysCellIdUTRA-FDD,
    utra-BCCH-Container-r9  OCTET STRING
}
CellInfoListUTRA-TDD-r9 ::=   SEQUENCE (SIZE (1..maxCellInfoUTRA-r9)) OF CellInfoUTRA-
TDD-r9
CellInfoUTRA-TDD-r9 ::=   SEQUENCE {
    physCellId-r9           PhysCellIdUTRA-TDD,
    utra-BCCH-Container-r9  OCTET STRING
}
CellInfoListUTRA-TDD-r10 ::=   SEQUENCE (SIZE (1..maxCellInfoUTRA-r9)) OF CellInfoUTRA-
TDD-r10
CellInfoUTRA-TDD-r10 ::=   SEQUENCE {
    physCellId-r10          PhysCellIdUTRA-TDD,
    carrierFreq-r10         ARFCN-ValueUTRA,
    utra-BCCH-Container-r10 OCTET STRING
}

-- ASN1STOP
```

Figure 17A

| RRCConnectionRelease field descriptions |
|---|
| *carrierFreq* or *bandClass* |
| The carrier frequency (UTRA and E-UTRA) and band class (HRPD and 1xRTT) for which the associated cellReselectionPriority is applied. |
| *carrierFreqs* |
| The list of GERAN carrier frequencies organised into one group of GERAN carrier frequencies. |
| *cellInfoList* |
| Used to provide system information of one or more cells on the redirected inter-RAT carrier frequency. The system information can be used if, upon redirection, the UE selects an inter-RAT cell indicated by the *physCellId* and *carrierFreq* (GERAN and UTRA TDD) or by the *physCellId* (other RATs). The choice shall match the *redirectedCarrierInfo*. In particular, E-UTRAN only applies value *utra-TDD-r10* in case *redirectedCarrierInfo* is set to *utra-TDD-r10*. |
| *drb-ContinueROHC* |
| This field indicates whether to continue or reset the header compression protocol context for the DRBs configured with the header compression protocol. Presence of the field indicates that the header compression protocol context continues when UE initiates UP-EDT in the same cell, while absence indicates that the header compression protocol context is reset. |
| *extendedWaitTime* |
| Value in seconds for the wait time for Delay Tolerant access requests. |
| *freqPriorityListX* |
| Provides a cell reselection priority for each frequency, by means of separate lists for each RAT (including E-UTRA). The UE shall be able to store at least 3 occurrences of *FreqsPriorityGERAN*. If E-UTRAN includes *freqPriorityListEUTRA-v9e0* and/or *freqPriorityListEUTRA-v1310* it includes the same number of entries, and listed in the same order, as in *freqPriorityListEUTRA* (i.e. without suffix). Field *freqPriorityListExt* includes additional neighbouring inter-frequencies, i.e. extending the size of the inter-frequency carrier list using the general principles specified in 5.1.2. EUTRAN only includes *freqPriorityListExtEUTRA* if *freqPriorityListEUTRA* (i.e without suffix) includes *maxFreq* entries. If E-UTRAN includes *freqPriorityListExtEUTRA-v1310* it includes the same number of entries, and listed in the same order, as in *freqPriorityListExtEUTRA-r12*. |
| *IdleModeMeasurementConfig* |
| Indicates measurement configuration to be used by the UE in RRC_IDLE. |
| *IdleModeMobilityControlInfo* |
| Provides dedicated cell reselection priorities. Used for cell reselection as specified in TS 36.304 [4]. For E-UTRA and UTRA frequencies, a UE that supports multi-band cells for the concerned RAT considers the dedicated priorities to be common for all overlapping bands (i.e. regardless of the ARFCN that is used). |
| *redirectedCarrierInfo* |
| The *redirectedCarrierInfo* indicates a carrier frequency (downlink for FDD) and is used to redirect the UE to an E-UTRA or an inter-RAT carrier frequency, by means of the cell selection upon leaving RRC_CONNECTED as specified in TS 36.304 [4]. The value *geran* can only be included after successful security activation when UE is connected to 5GC. |

Figure 17B

| RRCConnectionRelease field descriptions |
|---|
| *releaseCause* |
| The *releaseCause* is used to indicate the reason for releasing the RRC Connection. The cause value *cs-FallbackHighPriority* is only applicable when *redirectedCarrierInfo* is present with the value set to *utra-FDD*, *utra-TDD* or *utra-TDD-r10*.<br>E-UTRAN should not set the *releaseCause* to *loadBalancingTAURequired* or to *cs-FallbackHighPriority* if the *extendedWaitTime* is present. |
| *systemInformation* |
| Container for system information of the GERAN cell i.e. one or more System Information (SI) messages as defined in TS 44.018 [45, table 9.1.1]. |
| *t320* |
| Timer T320 as described in section 7.3. Value minN corresponds to N minutes. |
| *utra-BCCH-Container* |
| Contains System Information Container message as defined in TS 25.331 [19]. |
| *smtc-targetNRcell* |
| This IE indicates the SMTC of the redirected target NR cell SSB based on the timing reference of current serving cell. If this IE is absent, the UE will check if it has the redirected carrier's SSB related information in the currently configured measurement objects and/or in the stored system information. If so, the UE uses so obtained SSB timing offset to search for the SSBs in the redirected carrier. If not, UE will assume 5ms SMTC periodicity as specified in section 4.1 of TS 38.213. |
| *subcarrierSpacingSSB* |
| Indicate subcarrier spacing of SSB of redirected target NR cell. If not present, the UE will check if it has the redirected carrier's SSB related information in the currently configured measurement objects and/or in the stored system information. If so, the UE uses so obtained SCS to search for the SSBs in the redirected carrier. If not, the UE searches for both the supported SCS values in the redirected carrier. Only the values 15 or 30 (<6GHz), 120 kHz or 240 kHz (>6GHz) are applicable. |

| Conditional presence | Explanation |
|---|---|
| EARFCN-max | The field is mandatory present if the corresponding *carrierFreq* (i.e. without suffix) is set to *maxEARFCN*. Otherwise the field is not present. |
| IdleInfoEUTRA | The field is optionally present, need OP, if the *IdleModeMobilityControlInfo* (i.e. without suffix) is included and includes freqPriorityListEUTRA; otherwise the field is not present. |
| NoRedirect-r8 | The field is optionally present, need OP, if the *redirectedCarrierInfo* (i.e. without suffix) is not included; otherwise the field is not present. |
| Redirection | The field is optionally present, need ON, if the *redirectedCarrierInfo* is included and set to *geran*, *utra-FDD*, *utra-TDD* or *utra-TDD-r10*; otherwise the field is not present. |
| UP-EDT | The field is optionally present, need ON, if the UE supports EDT and *releaseCause* is set to *rrc-Suspend*; otherwise the field is not present. |
| RedirectionNR | The field is mandatory present, if the *redirectedCarrierInfo* is included and set to 'nr-r15'; otherwise the field is not present. |

US 11,026,204 B2

METHODS PROVIDING RELEASE AND RE-DIRECT MESSAGE CONTENTS AND UE BEHAVIOR AND RELATED WIRELESS DEVICES

This application claims the benefit of U.S. Provisional Application No. 62/740,542 filed Oct. 3, 2018, the contents of which are hereby incorporated by reference herein.

TECHNICAL FIELD

The present disclosure relates generally to communications, and more particularly, to wireless communication methods, wireless devices, networks, and network nodes.

BACKGROUND

It has been agreed in New Radio NR to use different reference signals to aid mobility. The reference signals (RSs) to be used are Synchronization Signal Blocks (SSBlocks) and/or Channel State Information-Reference Signals (CSI-RSs). The LIE (also referred to as a wireless device) can be configured to use only SSBlocks, or only CSI-RSs or both the RSs for Radio Resource Management RRM measurements in the RRC_CONNECTED mode. A given reportConfig in NR may encompass the RS type for which the reporting configuration is applicable. These two RSs could use different number of beams per cell and different beamformers can be used even if the same number of beams are used per cell for both RSs. The LIE can be configured to use only SSBlocks in the RRC_IDLE/RRC_INACTIVE modes.

When the UE is in RRC_CONNECTED mode the measurement object provides the parameters related to where to find the reference signals corresponding to the frequency locations where the UE is supposed to perform measurements. Such measurement objects, however, may not always be readily available.

SUMMARY

Some embodiments of the present disclosure are directed to a method of operating a wireless device (also referred to herein as user equipment or a UE). The wireless device may receive a release message from a network node of a radio access network. The release message may include an identification of a redirected carrier. In response to the release message omitting synchronization block related parameters for the redirected carrier, the wireless device may check in measurement information configured for the wireless device for the synchronization block related parameters for the redirected carrier; and may perform synchronization signal measurements for the redirected carrier using the synchronization block related parameters in the measurement information.

Other embodiments of the present disclosure are directed to a wireless device that may perform operations of the method.

According to some embodiments disclosed herein, operations providing for performance of synchronization signal measurements or search of synchronization signals may be improved.

BRIEF DESCRIPTION OF THE DRAWINGS

Other features of the embodiments will be more readily understood from the following detailed description of specific embodiments thereof when read in conjunction with the accompanying drawings, in which:

FIGS. 10A and 10B is a diagram illustrating a MeasObjectNR information element (IE) in New Radio NR;

FIG. 11 is a diagram illustrating an agreement in the Radio Access Network RAN4 concerning release of a UE to a carrier regarding which the UE has not performed any measurements in the past (while being connected to the cell that releases the UE);

FIGS. 12A-12E are diagrams illustrating suggested changes for the RRCConnectionRelease message in Long Term Evolution LTE;

FIGS. 13A and 13B are diagrams illustrating RRCConnectionRelease field descriptions for the suggested changes illustrated in FIGS. 12A-12E;

FIGS. 16A-16E are diagrams illustrating a configuration in the redirectedCarrierInfo in the RRCRelease message in accordance with some embodiments of the present disclosure; and FIGS. 17A-17B are diagrams illustrating RRCConnectionRelease field descriptions for the configuration in the redirectedCarrierInfo in the RRCRelease message illustrated in FIGS. 16A-16E in accordance with some embodiments of the present disclosure.

DETAILED DESCRIPTION

Figure 1:
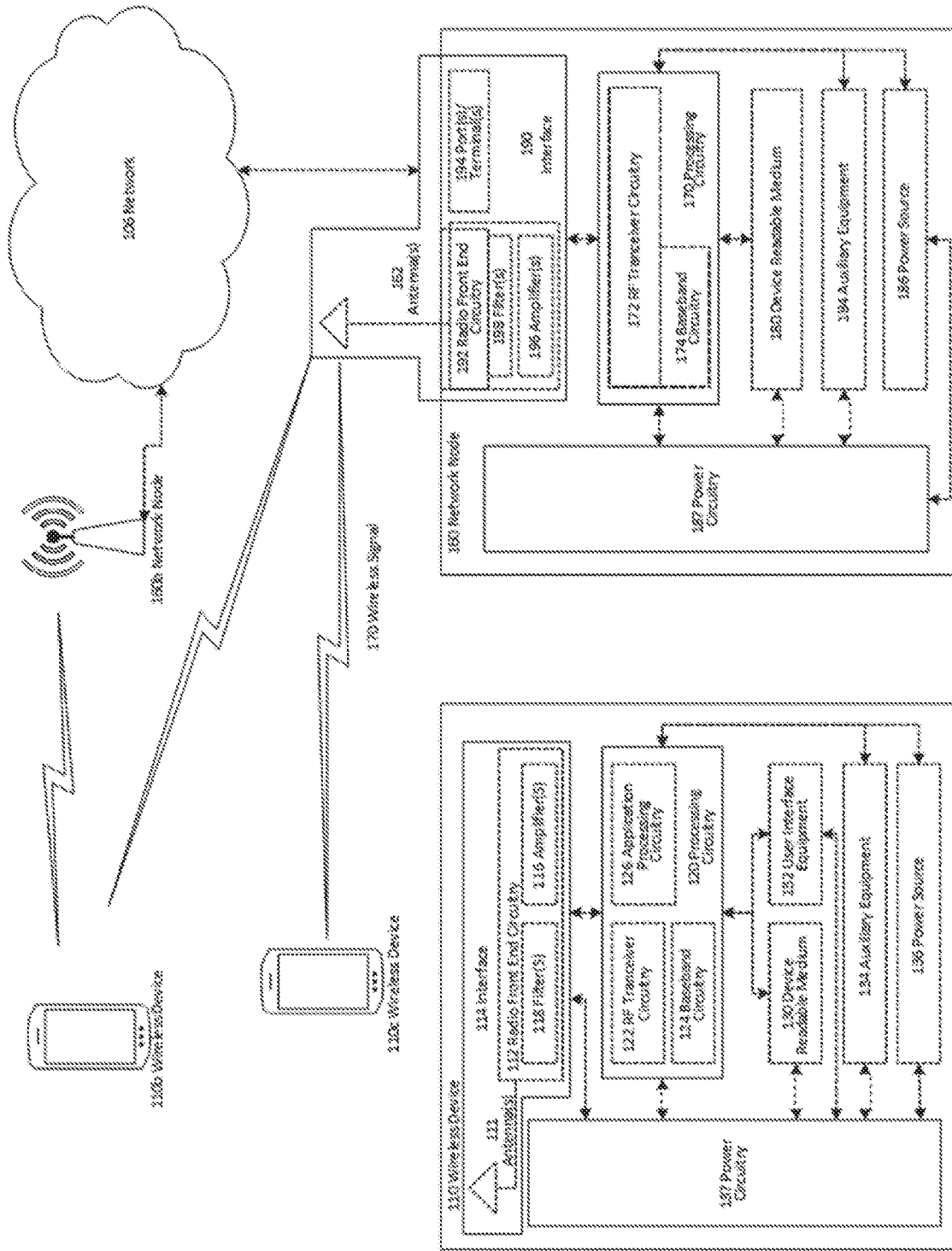
FIG. 1 illustrates a wireless network, in accordance with some embodiments of the present disclosure.

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Certain aspects of the present disclosure and their embodiments may provide solutions to the challenges discussed above and/or other challenges. There are, proposed herein, various embodiments which may address one or more of the issues disclosed herein.

The Information Element IE MeasObjectNR specifies information applicable for SS/PBCH (Synchronization Signal/Physical Broadcast Channel) block(s) intra/inter-frequency measurements or CSI-RS intra/inter-frequency measurements.

FIGS. 10A and 10B are diagrams illustrating a MeasObject NR information element (IE) in New Radio NR.

In the RAN4 (Radio Access Network 4), it was agreed that the network can release the UE to a carrier regarding which the UE has not performed any measurements in the past (while being connected to the cell that releases the UE). This is called blind release and redirect. In order to aid the UE to perform measurements in such a carrier, the serving cell can include the synchronization signal block (SSB) timing offset and sub-carrier spacing (SCS) related parameters in the RedirectedCarrierInfo (see, for example, 3GPP TS 38.331 v15.4, section 6.2.2).

FIG. 11 is a diagram illustrating an agreement in the Radio Access Network RAN4 concerning release of a UE to a carrier regarding which the UE has not performed any measurements in the past (while being connected to the cell that releases the UE).

There currently exist certain challenges. Some companies have proposed to include Subcarrier Spacing (SCS) and synchronization signal (SS) block-based RRM measurement timing configuration (SMTC) parameters in the Radio Resource Control RRC specifications (3GPP TSG RAN WG2 Meeting #103 R2-1811079). There are also clarifications as to what the UE behavior should be in case these parameters are not supported. In the suggested proposal, if the SMTC parameter is not present then the UE may assume a periodicity of 5 ms and the SCS is provided mandatorily.

The RRCConnectionRelease message is used to command the release of an RRC connection, or to complete an EDT procedure.

Signalling radio bearer: SRB1
RLC-SAP: AM
Logical channel: Dedicated Control Channel DCCH
Direction: Evolved Universal Terrestrial Radio Access Network E-UTRAN to UE FIGS. 12A-12E are diagrams illustrating the suggested changes for the RRCConnectionRelease message in Long Term Evolution LTE.

FIGS. 13A and 13B are diagrams illustrating RRCConnectionRelease field descriptions for the suggested changes illustrated in FIGS. 12A-12E.

There are several scenarios to consider the optimality of this solution: (1) The UE is sent to a carrier regarding which there was no information available at the UE prior to receiving the release-with-redirect message; and/or (2) The LIE is sent to a carrier regarding which there is information available at the UE prior to receiving the release-with-redirect message. In this case, the UE might be configured with the relevant measurement object related to the carrier to which the UE is redirected; and/or the UE might have stored system information based on idle mode measurements before corning to RRC_CONNECTED mode in the cell.

The approach suggested above (when SCS and SMTC are not configured) works well in scenarios mentioned in 1) but may not be optimal for scenarios mentioned in 2) as the LIE has to discard all the available information related to the redirected carrier and assume default SMTC and SCS parameters. This is a waste of stored system information and/or available MeasConfig information at the UE.

Operations of a user device UE (also referred to herein as a wireless device) will now be discussed with reference to the flow charts of FIGS. 14 and 15 in accordance with some embodiments of the present disclosure. For example, the UE may be implemented using the structure of wireless device 110 of FIG. 1 with program code stored in device readable medium 130 (also referred to as memory) so that the program code provides instructions so that when the instructions of the program code are executed by processing circuitry 137, processing circuitry 137 performs respective operations. Processing circuitry 137 of the UE may thus transmit and/or receive communications to/from one or more network nodes 160 of a wireless communication network through interface 114.

At block 1410, the LIE may receive measurement information while in the RRC-CONNECTED state (block 1410). The measurement information may include configured measurement object(s) in measConfig, while being in RRC_Connected state, including synchronization block related parameters for the redirected carrier. At block 1420, the LIE, may receives a release message. The release message may be a RRCRelease message and may include a redirectedCarrierInfo information element. At block 1430, the LIE may check whether synchronization block (SSBlock) related parameters for the redirected carrier are omitted or present. At block 1440, if the SSBlock related parameters for the redirected carrier are present, the UE may perform synchronization signal measurements for SSBlocks in the redirected carrier (a synchronization signal) using the provided parameters. This may involve searching for SSBlocks.

The synchronization block (SSBlock) related parameters (also referred to as a synchronization signal) may include synchronization signal radio resource management measurement timing configuration parameters including a periodicity, a timing offset, a duration, and/or subcarrier spacing parameters.

At block 1450, if the SSBlock related parameters for the redirected carrier (a synchronization signal) are omitted, the UE may check in the measurement information for SSBlock related parameters while the UE was in the connected state (a synchronization signal). For example, the UE may check in measConfig for any configured measurement object(s), configured while being in RRC_CONNECTED state, corresponding to the redirected carrier. If the measurement information does not include SSBlock related parameters while the UE was in the connected state (a synchronization signal), the UE may perform synchronization signal measurements or search for the synchronization signal using a specified periodicity. The specified periodicity may be 5 ms.

At block 1470, if the measurement information includes parameters from the connected state, the UE may perform synchronization signal measurements or search for SSBlock related parameters in the redirected carrier (a synchronization signal) using a SSBlock related parameters (a synchronization signal) from the connected state.

If SSBlock related parameter(s) are omitted in the measurement information for the UE while the UE was in the connected state, at block 1520 the UE may check in the measurement information for stored system information related to the carrier towards which the UE is redirected to. If SSBlock related parameter(s) are present in the measurement information, at block 1530 the UE may perform synchronization signal measurements or search for the SSBlocks in the redirected carrier (a synchronization signal) using the SSBlock related parameters from the stored system information.

At block 1460, if the measurement information does not include stored system information, the UE may perform synchronization signal measurements or search for both the supported subcarrier spacing (SCS) in the redirected carrier (a synchronization signal(s)) using a specified periodicity. The subcarrier spacing (SCS) values may be 15 kHz and 30 kHz and/or 120 kHz and 240 kHz. The specified periodicity may be 5 ms.

Figure 14:
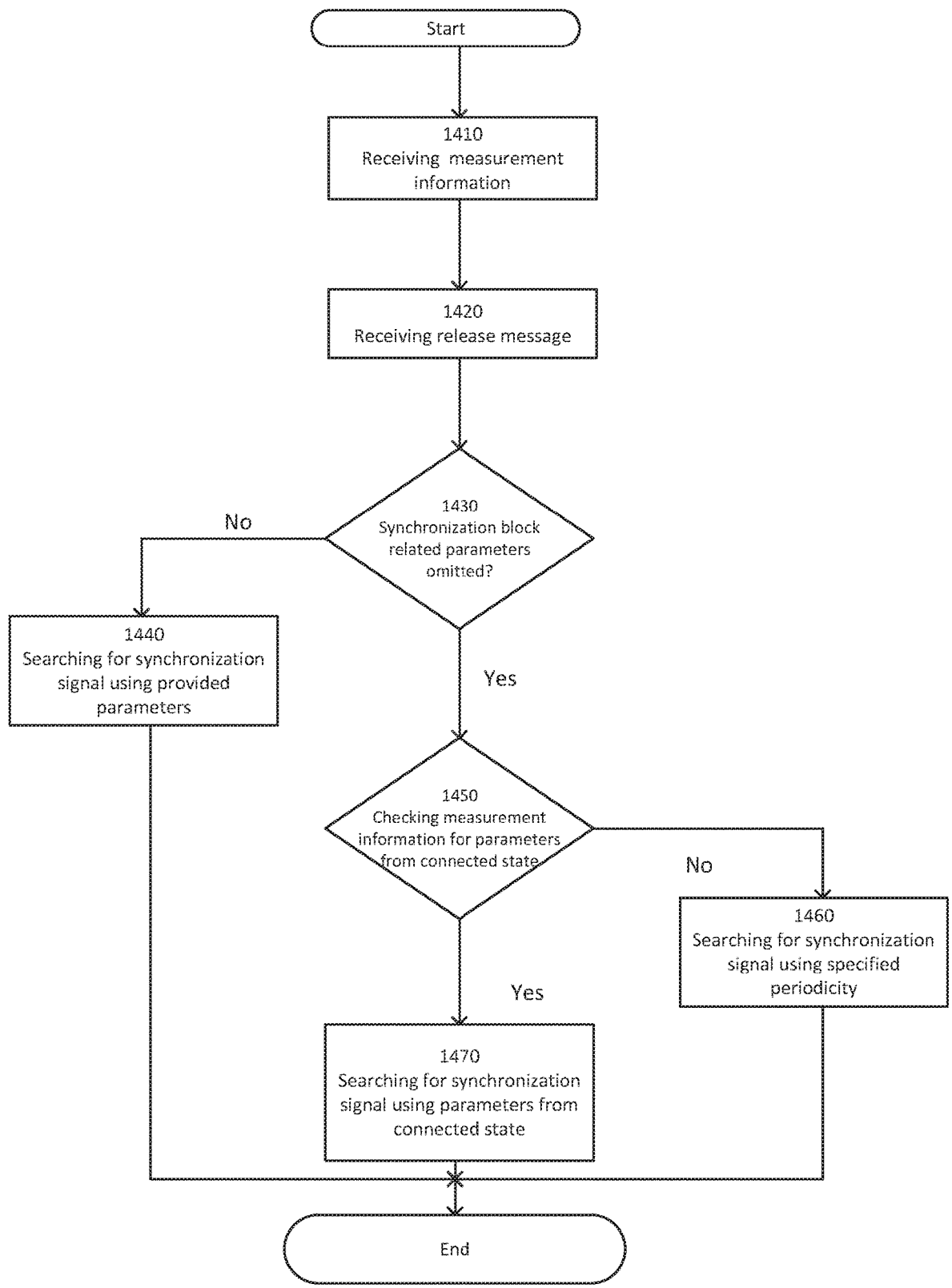
FIG. 14 is a flow chart illustrating methods implemented in a user device UE (also referred to herein as a wireless device) in accordance with some embodiments of the present disclosure.
Figure 15:
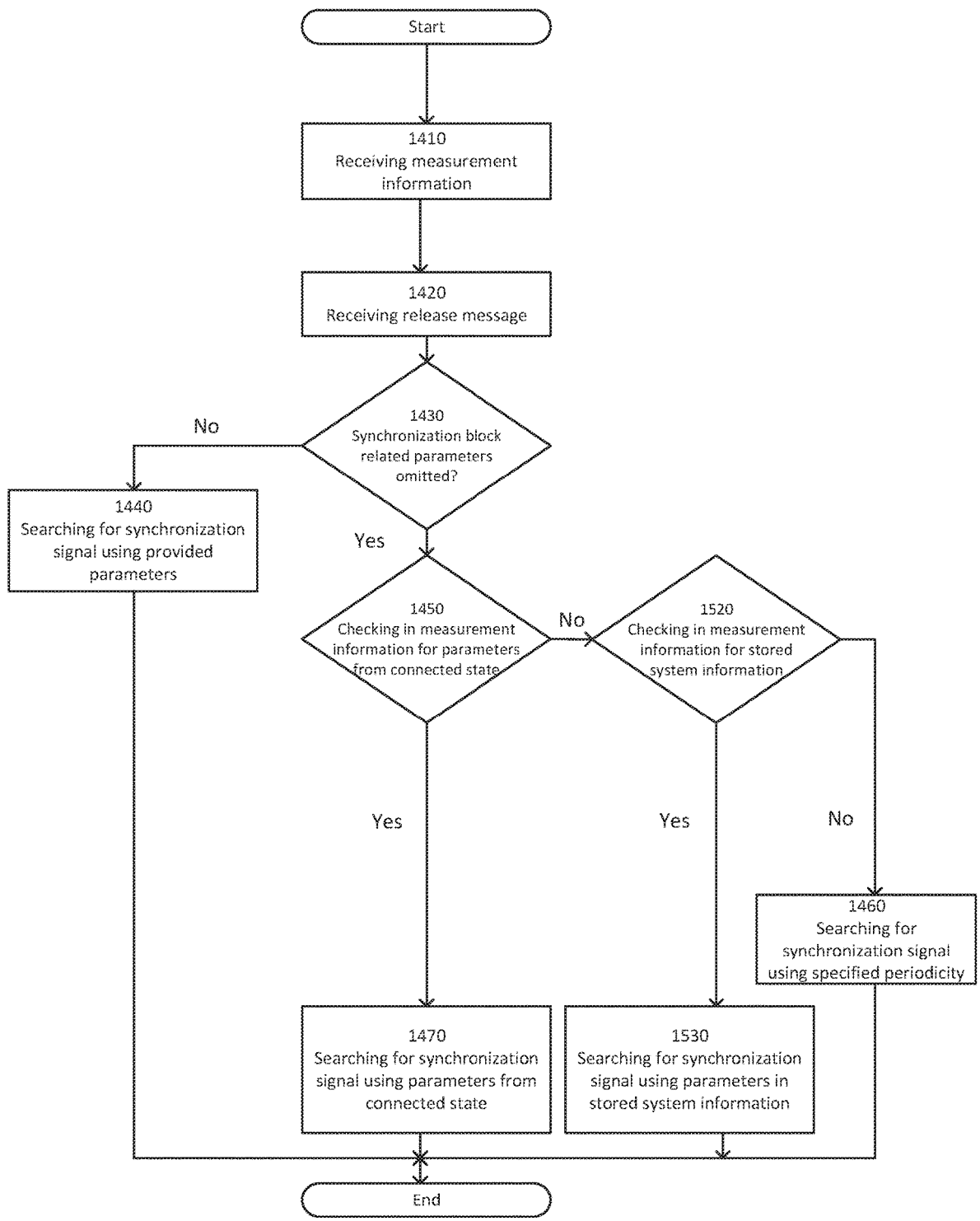
FIG. 15 is a flow chart illustrating methods implemented in a user device UE (also referred to herein as a wireless device) in accordance with some embodiments of the present disclosure.

Various operations of FIGS. 14 and 15 may be optional with respect to some embodiments. For example, the operations of blocks 1410 and 1440 may be optional according to some embodiments.

Figure 2:
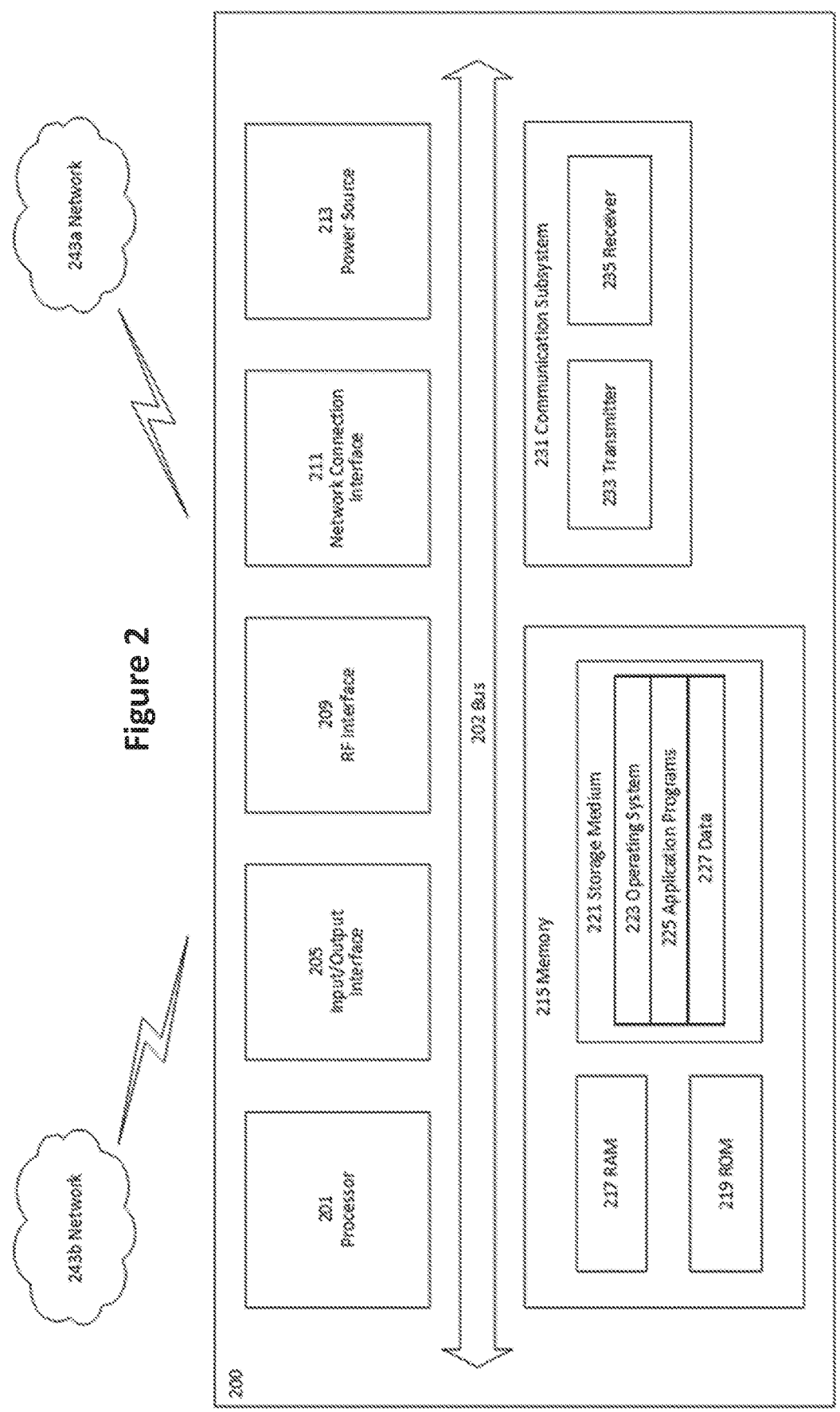
FIG. 2 is a block diagram illustrating a user equipment UE (also referred to as a wireless device) in accordance with some embodiments of the present disclosure.

FIG. 2 is a block diagram illustrating a UE in accordance with some embodiments of the present disclosure.

According to some embodiments, additional methods and apparatuses are disclosed, as will be discussed in more detail below.

Some embodiments may provide one or more of the following technical advantages. For instance, some embodiments may allow the UE to find the SSBlocks in the redirected carrier more easily when the redirectedCarrierInfo in the RRCRelease message do not include the SSBlock specific parameters. This may speed up the cell search and cell selection in the redirected carrier. Some embodiments may provide some, none, or all of these advantages, and additional technical advantages may be readily apparent to those of skill in the art.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

To obtain such flexibility for the UE and the network in terms of configuring it, the redirectedCarrierInfo information element in the RRCRelease message may have an optional configuration. FIGS. 16A-16E are diagrams illustrating a configuration in the redirectedCarrierInfo in the RRCRelease message in accordance with some embodiments of the present disclosure. FIGS. 17A-17B are diagrams illustrating RRCConnectionRelease field descriptions for the configuration in the redirectedCarrierInfo in the RRCRelease message illustrated in FIGS. 16A-16E in accordance with some embodiments of the present disclosure.

Additionally, there may be a timer associated with how long the previously acquired system information is valid for in order to be used for deriving the SSB related information when the SSB related information is not provided in the release message with redirect info and when the UE was also not configured with the relevant MOs when in connected.

It is to be noted that the same may be applicable for the blind handover scenario wherein the UE is handover to a carrier in which it has not performed a measurement while being in RRC CONNECTED mode in the current serving cell.

FIG. 1 illustrates a wireless network, in accordance with some embodiments of the present disclosure.

Although the subject matter described herein may be implemented in any appropriate type of system using any suitable components, the embodiments disclosed herein are described in relation to a wireless network, such as the example wireless network illustrated in FIG. 1. For simplicity, the wireless network of: FIG. 1 depicts network 106, network nodes 160 and 160*b*, and WDs 110, 110*b*, and 110*c*. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, and evolved Node Bs (eNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 1, network node 160 includes processing circuitry 170, device readable medium 180, interface 190, auxiliary equipment 184, power source 186, power circuitry 187, and antenna 162. Although network node 160 illustrated in the example wireless network of FIG. 1 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATS) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media, (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc, and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any, transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 1 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as a machine-type communication (MTC) device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RE transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RE transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RE signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

FIG. 2 is a block diagram illustrating a UE in accordance with some embodiments of the present disclosure. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user. A UE may also comprise any UE identified by the $3^{rd}$ Generation Partnership Project (3GPP), including a NB-IoT UE that is not intended for sale to, or operation by, a human user. UE 200, as illustrated in FIG. 2, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 2 is a UE, the components discussed herein are equally applicable to a WD, and vice-versa.

In FIG. 2, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 2, or only a subset of the components. The level of integration between the components may vary from one UE to another UE. Further, certain UEs may contain multiple instances of a component, such as multiple processors, memories, transceivers, transmitters, receivers, etc.

In FIG. 2, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 2, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Btu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 2, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any, combination of hardware, software or firmware. In one example, communication subsystem 231 may be configured to include any of the components described herein. Further, processing circuitry 201 may be configured to communicate with any of such components over bus 202, in another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 3:
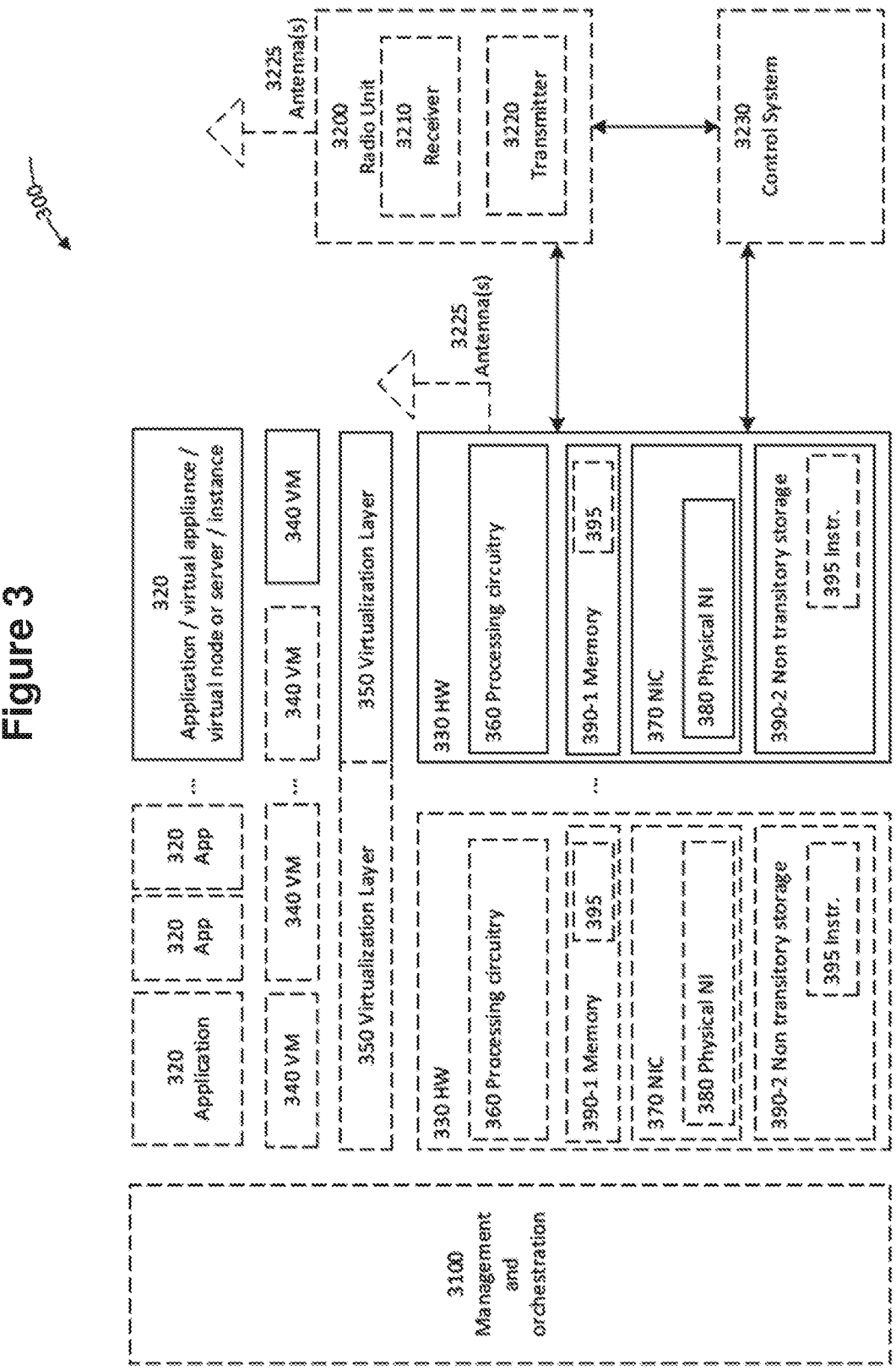
FIG. 3 is a block diagram illustrating a virtualization environment in accordance with some embodiments of the present disclosure.

FIG. 3 is a block diagram illustrating a virtualization environment 300 in accordance with some embodiments of the present disclosure. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 3, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 3.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 4:
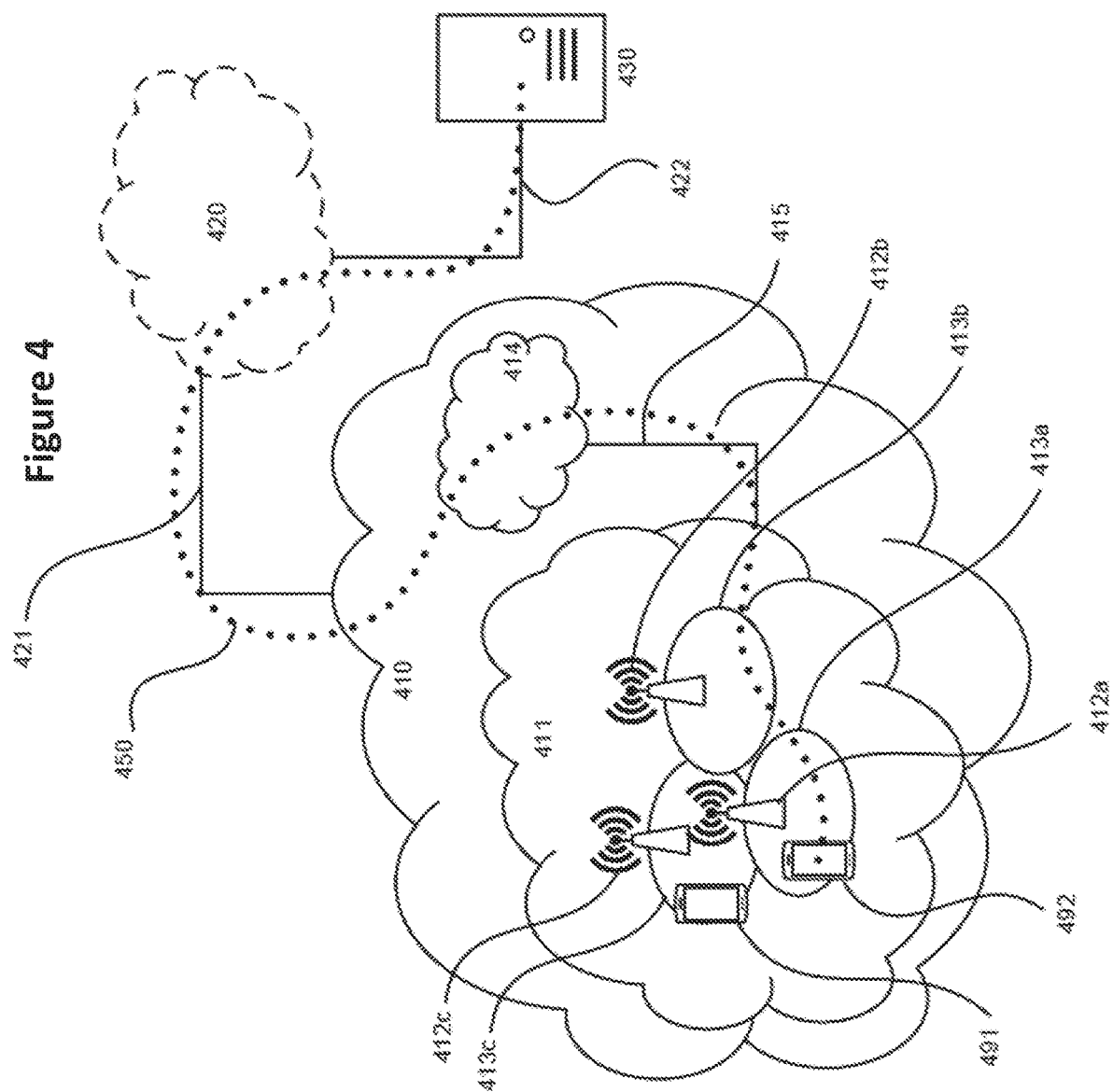
FIG. 4 is a schematic diagram illustrating a telecommunication network connected via an intermediate network to a host computer in accordance with some embodiments of the present disclosure.

FIG. 4 is a schematic diagram illustrating a telecommunication network connected via an intermediate network to a host computer in accordance with some embodiments of the present disclosure. A communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 4 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Example implementations, in accordance with an embodiment, of the UE, base station and host computer discussed in the preceding paragraphs will now be described with reference to FIG. 5. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 5) served by base station 520. Communication interface 526 may be configured to facilitate connection 560 to host computer 510. Connection 560 may be direct or it may pass through a core network (not shown in FIG. 5) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

Figure 5:
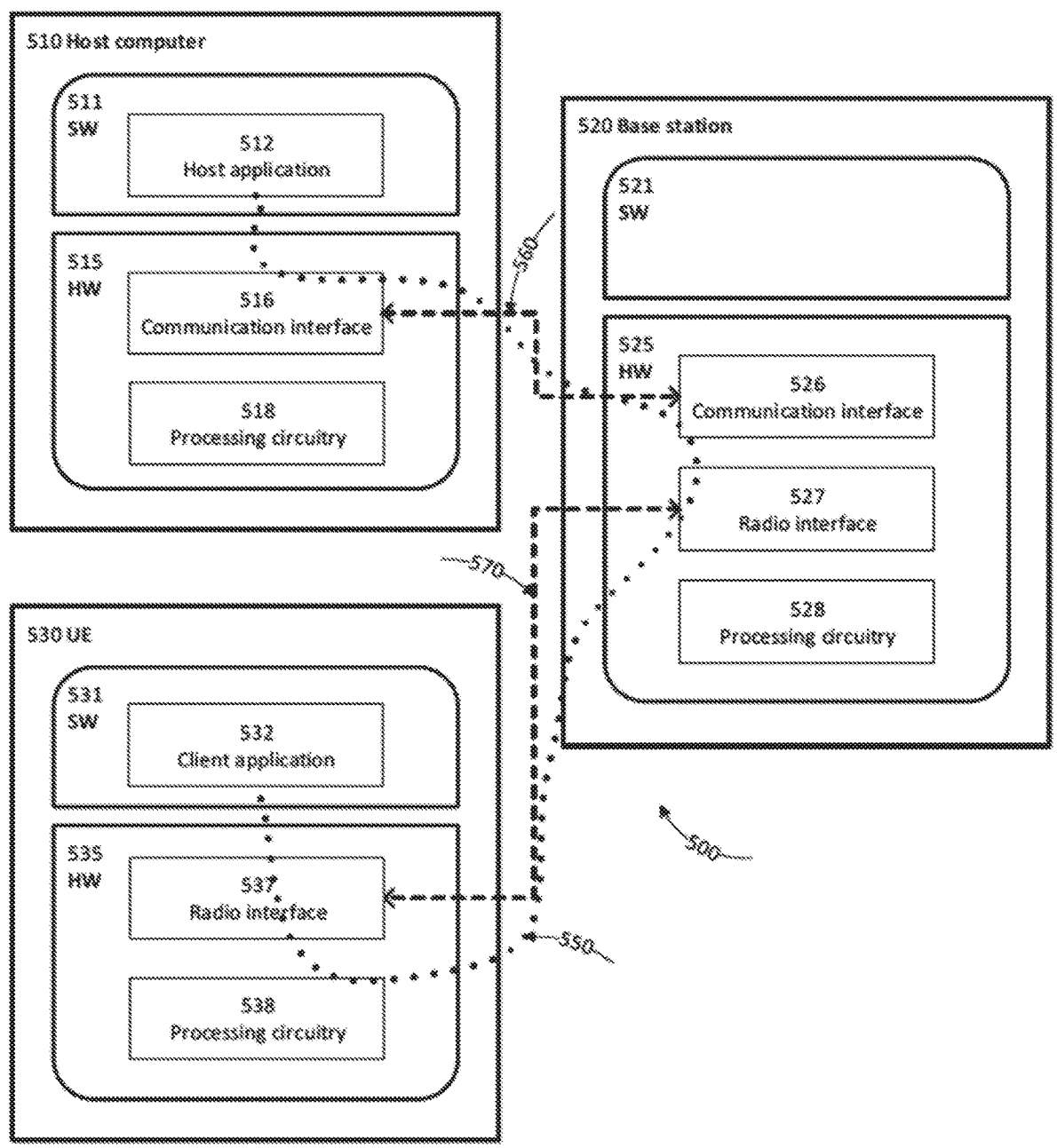
FIG. 5 is a block diagram illustrating a host computer communicating via a base station with a user equipment over a partially wireless connection in accordance with some embodiments of the present disclosure.

It is noted that host computer 510, base station 520 and UE 530 illustrated in FIG. 5 may be similar or identical to host computer 430, one of base stations 412a, 412b, 412c and one of UEs 491, 492 of FIG. 4, respectively. This is to say, the inner workings of these entities may be as shown in FIG. 5 and independently, the surrounding network topology may be that of FIG. 4.

In FIG. 5, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the latency and power consumption, and thereby provide benefits such as reduced user waiting time, better responsiveness, and extended battery lifetime.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 6:
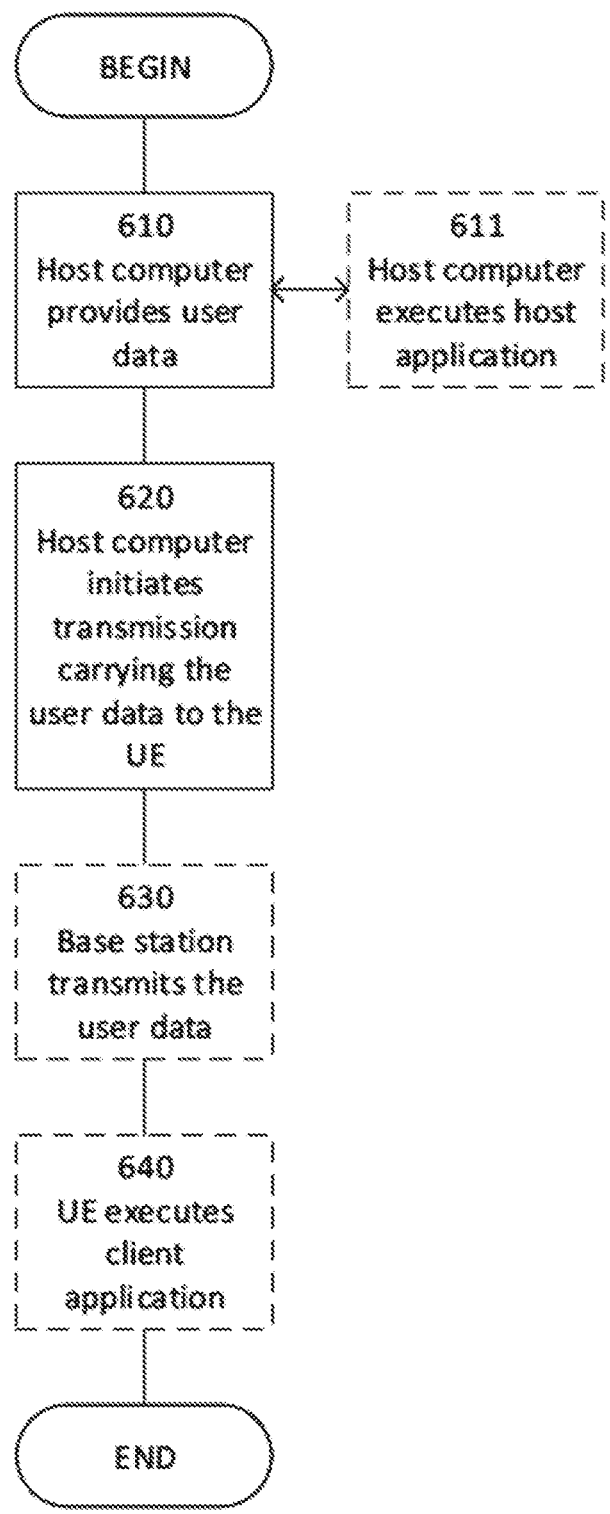
FIG. 6 is a flow chart illustrating methods implemented in a communication system including a host computer, a base station and a user equipment in accordance with some embodiments of the present disclosure.

FIG. 6 is a flowchart illustrating methods implemented in a communication system, in accordance with some embodiments of the present disclosure. The communication system includes a host computer, a base station and a UE which may be those described with reference to FIGS. 4 and 5. For simplicity of the present disclosure, only drawing references to FIG. 6 will be included in this section. In step 610, the host computer provides user data. In substep 611 (which may be optional) of step 610, the host computer provides the user data by executing a host application.

In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 7:
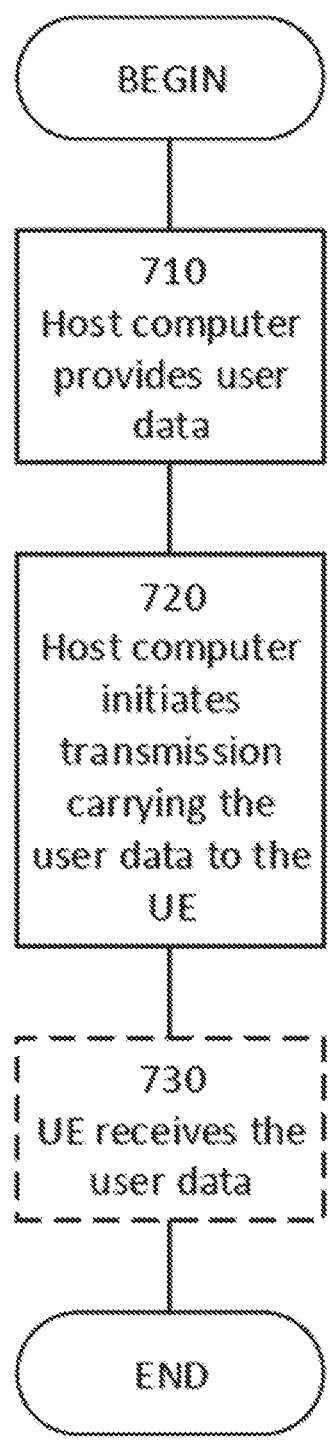
FIG. 7 is a flow chart illustrating methods implemented in a communication system including a host computer, a base station and a user equipment in accordance with some embodiments of the present disclosure.

FIG. 7 is a flowchart illustrating methods implemented in a communication system, in accordance with some embodiments of the present disclosure. The communication system includes a host computer, a base station and a UE which may be those described with reference to FIGS. 4 and 5. For simplicity of the present disclosure, only drawing references to FIG. 7 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 8:
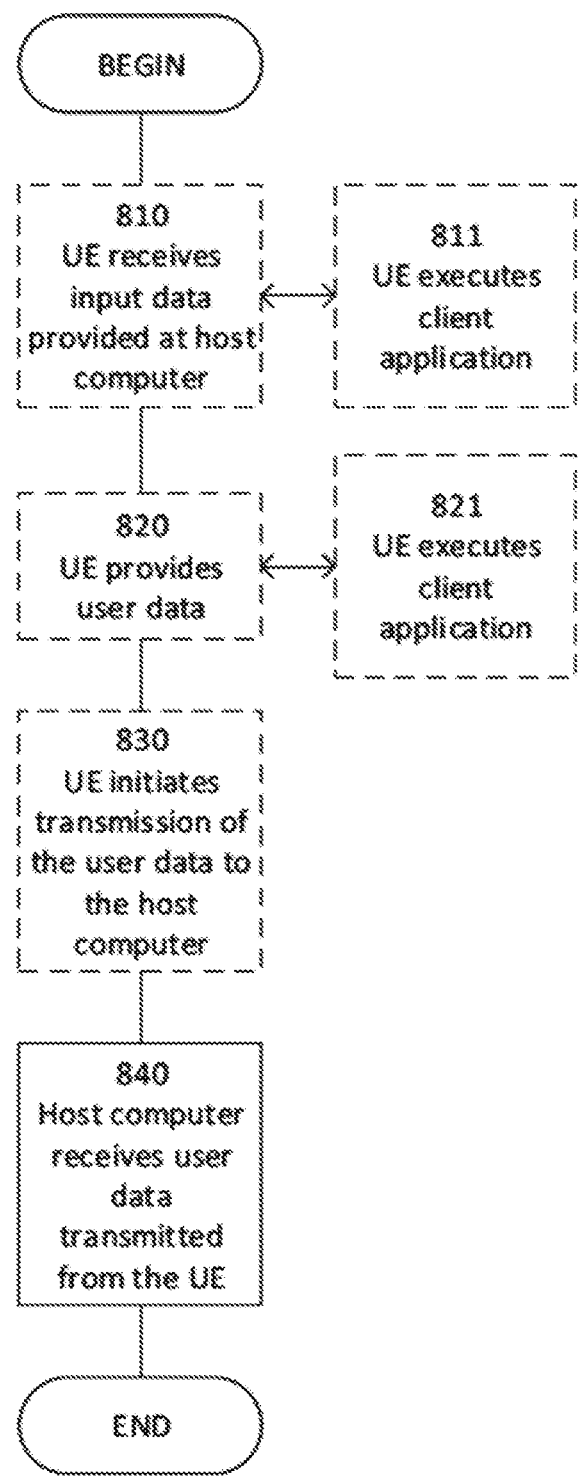
FIG. 8 is a flow chart illustrating methods implemented in a communication system including a host computer, a base station and a user equipment in accordance with some embodiments of the present disclosure.

FIG. 8 is a flowchart illustrating methods implemented in a communication system, in accordance with some embodiments of the present disclosure. The communication system includes a host computer, a base station and a UE which may be those described with reference to FIGS. 4 and 5. For simplicity of the present disclosure, only drawing references to FIG. 8 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 9:
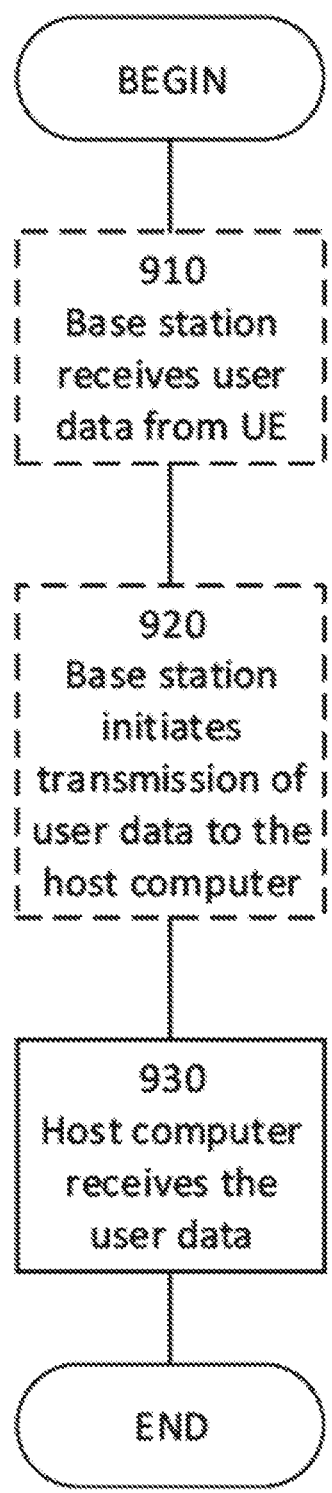
FIG. 9 is a flow chart illustrating methods implemented in a communication system including a host computer, a base station and a user equipment in accordance with some embodiments of the present disclosure.

FIG. 9 is a flowchart illustrating methods implemented in a communication system, in accordance with some embodiments of the present disclosure. The communication system includes a host computer, a base station and a UE which may be those described with reference to FIGS. 4 and 5. For simplicity of the present disclosure, only drawing references to FIG. 9 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Abbreviations

At least some of the following abbreviations may be used in this disclosure. If there is an inconsistency between abbreviations, preference should be given to how it is used above. If listed multiple times below, the first listing should be preferred over any subsequent listing(s).

1xRTT CDMA2000 1x Radio Transmission Technology
3GPP 3rd Generation Partnership Project
5G 5th Generation
ABS Almost Blank Subframe
ARQ Automatic RepeatRequest
AWGN Additive White GaussianNoise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR (corresponding to eNB in LTE)
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit SFN System Frame Number
SGW Serving Gateway
SI System Information
SIB System Information Block
SNR Signal to Noise Ratio
SON Self Optimized Network or Self-Organizing Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

What is claimed is:

1. A method of operating a wireless device, comprising:
receiving a release message from a network node of a radio access network, wherein the release message includes an identification of a redirected carrier;
responsive to the release message omitting synchronization block related parameters for the redirected carrier, checking in measurement information configured for the wireless device for the synchronization block related parameters for the redirected carrier; and
performing synchronization signal measurements for the redirected carrier using the synchronization block related parameters in the measurement information.

2. The method of claim 1, wherein the synchronization block related parameters comprise synchronization signal radio resource management measurement timing configuration parameters; and
wherein the synchronization signal radio resource management measurement timing configuration parameters comprise at least one of: a periodicity, a timing offset, and a duration.

3. The method of claim 1, wherein the synchronization block related parameters comprise subcarrier spacing parameters.

4. The method of claim 3, wherein the subcarrier spacing values are 15 kHz and 30 kHz.

5. The method of claim 3, wherein the subcarrier spacing values are 120 kHz and 240 kHz.

6. The method of claim 1, wherein checking comprises checking in the measurement information for the synchronization block related parameters for the redirected carrier from a connected state of the wireless device to the redirected carrier, the synchronization block related parameters for the redirected carrier are included in the measurement information, and wherein performing synchronization signal measurements comprises searching for the synchronization signal using the synchronization block related parameters for the redirected carrier from the measurement information.

7. The method of claim 6 further comprising:
receiving the measurement information including the synchronization block related parameters for the redirected carrier.

8. The method of claim 1, wherein the synchronization block related parameters for the redirected carrier are omitted from the measurement information, and wherein performing synchronization signal measurements for the redirected carrier comprises searching for the synchronization signal for the redirected carrier using a specified periodicity.

9. The method of claim 8, wherein the specified periodicity is 5 milliseconds.

10. The method of claim 1, further comprising:
wherein checking comprises checking in the measurement information for the synchronization block related parameters for the redirected carrier from stored system information, the synchronization block related parameters for the redirected carrier are included in the measurement information, and wherein performing synchronization signal measurements comprises searching for the synchronization signal using the synchronization block related parameters for the redirected carrier from the measurement information.

11. The method of claim 10 further comprising:
receiving the measurement information message including the synchronization block related parameters for the redirected carrier.

12. The method of claim 10, wherein the synchronization block related parameters for the redirected carrier are omitted from the measurement information, and wherein performing synchronization signal measurements for the redirected carrier comprises searching for the synchronization signal for the redirected carrier using a specified periodicity.

13. The method of claim 12, wherein the specified periodicity is 5 milliseconds.

14. A wireless device comprising:
processing circuitry; and
device readable medium connected to the processing circuitry and storing program code that is executed by the processing circuitry to perform operations comprising:
receiving a release message from a network node of a radio access network, wherein the release message includes an identification of a redirected carrier;
responsive to the release message omitting synchronization block related parameters for the redirected carrier, checking in measurement information configured for the wireless device for the synchronization block related parameters for the redirected carrier; and
performing synchronization signal measurements for the redirected carrier using the synchronization block related parameters in the measurement information.

15. The wireless device of claim 14, wherein the synchronization block related parameters comprise synchronization signal radio resource management measurement timing configuration parameters; and
wherein the synchronization signal radio resource management measurement timing configuration parameters comprise at least one of: a periodicity, a timing offset, and a duration.

16. The wireless device of claim 14, wherein the synchronization block related parameters comprise subcarrier spacing parameters.

17. The wireless device of claim 16, wherein the plurality of subcarrier spacing values are 15 kHz and 30 kHz.

18. The wireless device of claim 16, wherein the plurality of subcarrier spacing values are 120 kHz and 240 kHz.

19. The wireless device of claim 14, wherein checking comprises checking in the measurement information for the synchronization block related parameters for the redirected carrier from a connected state of the wireless device to the redirected carrier, the synchronization block related parameters for the redirected carrier are included in the measurement information, and wherein performing synchronization signal measurements comprises searching for the synchronization signal using the synchronization block related parameters for the redirected carrier from the measurement information.

20. The wireless device of claim 19, wherein the device readable medium further stores program code that is executed by the at least one processor to perform operations comprising:
  receiving the measurement information including the synchronization block related parameters for the redirected carrier.

21. The wireless device of claim 14, wherein the synchronization block related parameters for the redirected carrier are omitted from the measurement information, and wherein performing synchronization signal measurements for the redirected carrier comprises searching for the synchronization signal for the redirected carrier using a specified periodicity.

22. The wireless device of claim 21, wherein the specified periodicity is 5 milliseconds.

23. The wireless device of claim 14, wherein checking comprises checking in the measurement information for the synchronization block related parameters for the redirected carrier from stored system information, the synchronization block related parameters for the redirected carrier are included in the measurement information, and wherein performing synchronization signal measurements comprises searching for the synchronization signal using the synchronization block related parameters for the redirected carrier from the measurement information.

24. The wireless device of claim 23, wherein the device readable medium further stores program code that is executed by the at least one processor to perform operations comprising:
  receiving the measurement information message including the synchronization block related parameters for the redirected carrier.

25. The wireless device of claim 23, wherein the synchronization block related parameters for the redirected carrier are omitted from the measurement information, and wherein performing synchronization signal measurements for the redirected carrier comprises searching for the synchronization signal for the redirected carrier using a specified periodicity.

26. The wireless device of claim 25, wherein the specified periodicity is 5 milliseconds.

\* \* \* \* \*

UNITED STATES PATENT AND TRADEMARK OFFICE
CERTIFICATE OF CORRECTION

PATENT NO. : 11,026,204 B2  
APPLICATION NO. : 16/553046  
DATED : June 1, 2021  
INVENTOR(S) : Ramachandra et al.

Page 1 of 3

It is certified that error appears in the above-identified patent and that said Letters Patent is hereby corrected as shown below:

In the Specification

In Column 1, Line 22, delete "LIE" and insert -- UE --, therefor.

In Column 1, Line 31, delete "LIE" and insert -- UE --, therefor.

In Column 3, Line 33, delete "Information Element IE" and insert -- Information Element, IE, --, therefor.

In Column 4, Line 16, delete "LIE" and insert -- UE --, therefor.

In Column 4, Line 25, delete "LIE" and insert -- UE --, therefor.

In Column 4, Line 44, delete "LIE" and insert -- UE --, therefor.

In Column 4, Line 45, delete "RRC-CONNECTED" and insert -- RRC_CONNECTED --, therefor.

In Column 4, Line 49, delete "LIE," and insert -- UE, --, therefor.

In Column 4, Line 50, delete "receives" and insert -- receive --, therefor.

In Column 4, Line 52, delete "LIE" and insert -- UE --, therefor.

In Column 4, Line 53, delete "synchronization block (SSBlock)" and insert -- synchronization signal block (SSBlock) --, therefor.

In Column 4, Line 60, delete "synchronization block (SSBlock)" and insert -- synchronization signal block (SSBlock) --, therefor.

In Column 6, Line 27, delete "of:" and insert -- of --, therefor.

Signed and Sealed this  
Fifteenth Day of March, 2022

Drew Hirshfeld  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 11,026,204 B2

In Column 8, Line 12, delete "RATS)" and insert -- RATs) --, therefor.

In Column 9, Line 13, delete "media," and insert -- media --, therefor.

In Column 9, Line 24, delete "etc," and insert -- etc. --, therefor.

In Column 10, Line 26, delete "any," and insert -- any --, therefor.

In Column 11, Line 20, delete "(CPE)." and insert -- (CPE), --, therefor.

In Column 11, Line 25, delete "(IoT)" and insert -- (IoTs) --, therefor.

In Column 11, Line 33, delete "(NB-IoT)" and insert -- (NB-IoTs) --, therefor.

In Column 11, Line 55, delete "NR," and insert -- NR, WiFi, --, therefor.

In Column 12, Line 6, delete "comprise" and insert -- comprises --, therefor.

In Column 12, Line 45, delete "RE" and insert -- RF --, therefor.

In Column 12, Line 58, delete "RE" and insert -- RF --, therefor.

In Column 12, Line 67, delete "RE" and insert -- RF --, therefor.

In Column 14, Line 29, delete "such" and insert -- (such --, therefor.

In Column 14, Lines 63-64, delete "power source 233," and insert -- power source 213, --, therefor.

In Column 16, Line 26, delete "(RAID)," and insert -- (RAIDs), --, therefor.

In Column 16, Line 29, delete "Btu-Ray" and insert -- Blu-Ray --, therefor.

In Column 16, Line 35, delete "(SIM/RUIM) module," and insert -- module (SIM/RUIM), --, therefor.

In Column 17, Line 20, delete "any," and insert -- any --, therefor.

In Column 17, Line 25, delete "202, in" and insert -- 202. In --, therefor.

In Column 18, Line 65, delete "(VNE)." and insert -- (VNEs). --, therefor.

In Column 23, Line 24, delete "according" and insert -- according to --, therefor.

In Column 23, Line 36, delete "RepeatRequest" and insert -- Repeat Request --, therefor.

In Column 23, Line 37, delete "GaussianNoise" and insert -- Gaussian Noise --, therefor.

CERTIFICATE OF CORRECTION (continued)
U.S. Pat. No. 11,026,204 B2

In Column 23, Line 50, delete "information" and insert -- Information --, therefor.

In Column 23, Line 52, delete "information" and insert -- Information --, therefor.

In Column 24, Line 16, delete "Services" and insert -- Service --, therefor.

In Column 24, Line 20, delete "Tests" and insert -- Test --, therefor.

In Column 25, Line 21, delete "Wide" and insert -- Wideband --, therefor.

In Column 25, Line 22, delete "Wide" and insert -- Wireless --, therefor.